United States Patent [19]

Akao et al.

[11] Patent Number: 5,443,872

[45] Date of Patent: * Aug. 22, 1995

[54] CONTAINER FOR PHOTOGRAPHIC FILM CARTRIDGE

[75] Inventors: Mutsuo Akao; Koji Inoue, both of Kanagawa, Japan

[73] Assignee: Fuji Photo Film Co., Ltd., Minami-Ashigara, Japan

[*] Notice: The portion of the term of this patent subsequent to Apr. 21, 2009 has been disclaimed.

[21] Appl. No.: 808,780

[22] Filed: Dec. 17, 1991

Related U.S. Application Data

[63] Continuation of Ser. No. 480,797, Feb. 16, 1990, Pat. No. 5,106,665.

[30] Foreign Application Priority Data

| Feb. 16, 1989 | [JP] | Japan | 1-35072 |
| Feb. 23, 1989 | [JP] | Japan | 1-41770 |
| Feb. 27, 1989 | [JP] | Japan | 1-20138 |
| Mar. 20, 1989 | [JP] | Japan | 1-68771 |
| Jun. 20, 1989 | [JP] | Japan | 1-71173 |

[51] Int. Cl.⁶ .................................. B65D 85/672

[52] U.S. Cl. .................... 428/35.7; 428/36.92; 206/407

[58] Field of Search ............. 428/36.92, 156, 35.7; 206/407, 455

[56] References Cited

FOREIGN PATENT DOCUMENTS

| 0039739 | 11/1979 | European Pat. Off. |
| 61-73947 | 4/1986 | Japan |
| 62-145242 | 6/1987 | Japan |
| 62-26061 | 8/1988 | Japan |
| 63-193142 | 8/1988 | Japan |

*Primary Examiner*—Charles R. Nold
*Attorney, Agent, or Firm*—Burns, Doane, Swecker & Mathis

[57] ABSTRACT

Container bodies for a photographic film cartridge which has solved white powder generation problem by devising the Rockwell hardness, a blend of lubricants, a blend of polypropylene resins or a combination of a particular resin composition and groove formation. While, moistureproofness to can be improved by thickening the gate mark portion.

21 Claims, 10 Drawing Sheets

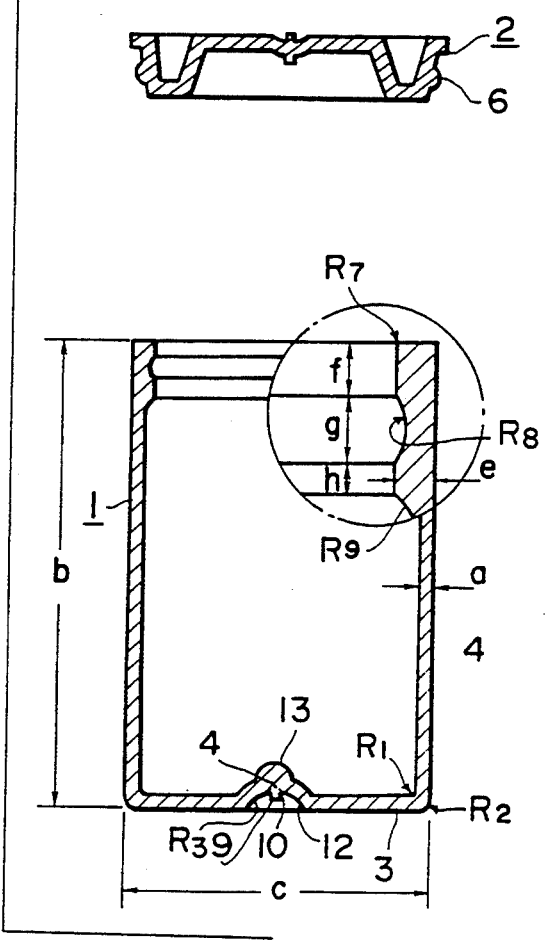
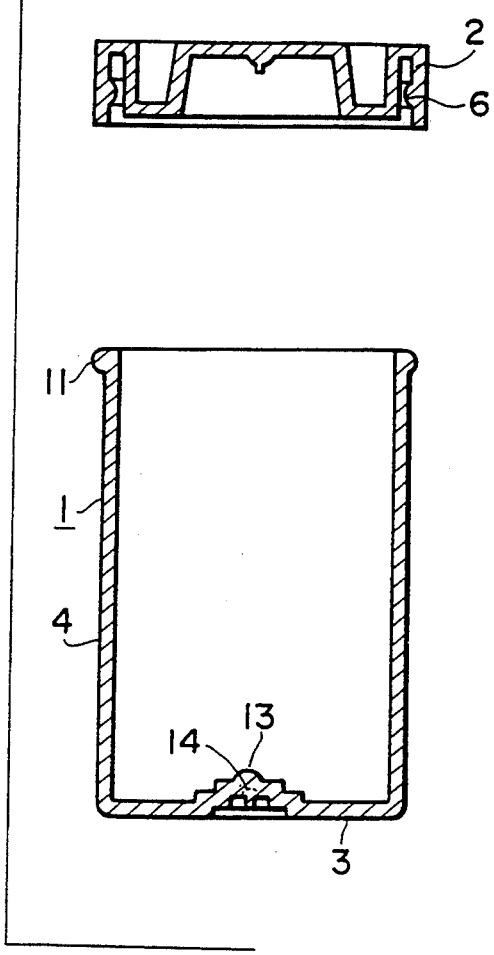
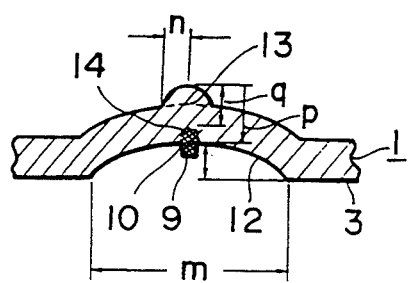
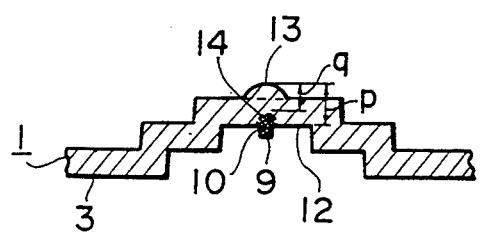

CONTAINER FOR PHOTOGRAPHIC FILM CARTRIDGE

This application is a continuation of application Ser. No. 07/480,797, filed Feb. 16, 1990; U.S. Pat. No. 5,106,665.

BACKGROUND OF THE INVENTION

1. Field of the Invention

This invention relates to containers for a photographic film cartridge.

2. Description of the Prior Art

A common photographic film cartridge is shown in FIG. 26. A photographic film is wound around a spool 16 made of plastic resin, and placed in the cartridge body 18. The cartridge is well known as a JIS 135 type cartridge, and light-shielding members called teremp cloth are attached to the exit slit of the cartridge body 18 (e.g. Japanese Utility Model KOKOKU No. 41-6297). The leading end of the photographic film is called a tongue 17. Various improvements have been made with respect to the exit light-shielding structure (e.g. Japanese Patent KOKOKU No. 43-3416, Japanese Utility Model KOKOKU No. 37-32164). Improvements in the cartridge body 18 have also been made, and a cartridge body made of a plastic resin was proposed for the purpose of reducing weight (Japanese Patent KOKAI No. 55-21089).

The photographic film cartridge is placed, for example, in a container shown in FIG. 1. The container consists of a container body 1 and a cap 2 fitted thereto. The container body 1 is formed of a cylindrical shape having a bottom composed of a bottom portion 3 and a peripheral wall portion 4. An annular fitting groove 5 is formed near the upper edge on the inside of the peripheral wall portion 4, and an annular projection 6 to be fitted into the groove 5 is formed on the container cap 2. A semispherical recess 12 is formed at the bottom portion 3, and a projection of gate mark portion 9 remains therein. Some other container bodies are illustrated in FIGS. 4 through 8. Such a container body is produced by injection molding. That is, a melted resin is injected into a mold through the gate portion 10, and after solidified by cooling, it is taken out of the mold. In the case of container bodies for a photographic film cartridge, since a great quantity is mass-produced, a multi-cavity mold is used in a hot runner type, and the container bodies are molded at a high speed.

The present inventor has investigated in order to improve containers for photographic film cartridges, and has disclosed a container body made of a polypropylene resin having a propylene unit content of more than 70 wt. %, a melt index (ASTM D-1238) of 16 to 80 g/10 minutes, a yielding point of tensile stress of higher than 250 kg/cm$^2$, a bending elastic modulus of higher than 10,000 kg/cm$^2$ and a notched Izod impact strength of higher than 2.0 kg·cm/cm containing an organic nucleating agent (U.S. Pat. No. 4,639,386), a container body made of a particular polypropylene resin containing a fatty amide lubricant (Japanese Patent KOKAI No. 61-73947), a container body made of a resin composed of 60 to 99.9 wt. % of a particular polypropylene resin, 0 to 39.9 wt. % of polyethylene or ethylene copolymer resin and 0.1 to 15 wt. % of aluminum powder or aluminum paste (Japanese Patent KOKAI No. 61-250639), and a container body made of a resin containing a propylene-ethylene random copolymer composed of 95 to 99 wt. % of propylene units and 1.5 to 4 wt. % of ethylene units having a melt index (MI) of 10 to 70 g/10 minutes and a molecular weight distribution of 2.5 to 5.5 and containing an organic nucleating agent (Japanese Patent Application No. 63-158985).

In the case of the above conventional container for a photographic film cartridge, white powder occasionally adhered to the leading end of the photographic film, the teremp cloth attached to the exit slit of the cartridge or like during the physical distribution. The white powder gave unnecessary uncertainty to users and sometimes affected adversely photographic properties of the film.

The conventional container body for a photographic film cartridge has a sufficient impact strength. However, deformation of the opening, buckling and the like are liable to occur. When additives were increased in order to solve these problems, the additives bled to increase white powder generation. In the case of container bodies made of homopolypropylene resin, since the rigidity is made great, deformation of the opening, buckling and the like can be prevented. However, the impact strength is weak, and cracking is liable to occur by dropping.

Another problem of a conventional container body was in the occurrence of a bottom sink mark and buckling at the time of taking the container bodies out of their molds. The inventor found that the bottom sink mark and buckling occurred caused by the formation of a vacuum due to the smooth inner surface of the peripheral wall portion. Thereupon, the inventor devised a container body for a photographic film cartridge wherein at least more than one third from the bottom of the inner surface is made a rough face having at least 7 $\mu$m in depth (Japanese Patent KOKAI No. 63-193142). The roughed container body can be taken out of the core of the mold without the occurrence of a bottom sink mark and buckling. Incidentally, since a great deal of containers for a photographic film cartridge are produced, to decrease the resin quantity is very important.

Another problem is in that, when container bodies for a photographic film cartridge are molded by injection molding using a polyolefin resin having a MI of 10 to 60 g/10 minutes, particularly a propylene-$\alpha$-olefin copolymer containing more than 0.5 wt. % of $\alpha$-olefin at a high speed molding of less than 12 seconds/cycle using a multicavity mold of more than 16 cavities in a hot runner type, the gate mark portion 9 is occasionally scraped upon removal from the mold caused by uneven cooling. As a result, pinholes or a thin portion is produced which generates a problem in moistureproofness, and visual inspection is necessary.

SUMMARY OF THE INVENTION

An object of the invention is to provide a container for a photographic film cartridge wherein the generation of white powder is sharply reduced.

The present inventor investigated the cause of white powder generation, and found that it is caused by scratching the additives bled out of the inner surface of the container body by the leading end of the photographic film. That is, container bodies for a photographic film cartridge are formed of polypropylene resin to which are added various additives, such as a lubricant for improving antiblocking ability and putting the photographic film cartridge in and out, an organic nucleating agent for improving rigidity and various other additives for improving various properties. The additives such as the lubricant gradually bled out and were crystallized on the inner surface of the container body. During the physical distribution, the photographic film cartridge placed therein rotated or shook, and the leading end of the photographic film scratched the adhered additives to generate white powder. Besides, in the case of the container bodies made of a propylene-α-olefin copolymer resin of which the content of α-olefin such as ethylene is large, the resin itself was scratched so as to generate white powder.

As mentioned above, the present inventor has first found that the white powder generation was caused by the bleeding of the additives. Thereupon, the inventor further investigated particularly about the bleeding quantity of additives from various resins different in melt index, bending elastic modulus or the like. As a result, he found that the Rockwell hardness of the resin gives the greatest affect upon the bleeding out of the additives, and the white powder generation could be sharply reduced by rendering the Rockwell hardness more than a prescribed value.

Thus, the present invention provides a container body for a photographic film cartridge having a Rockwell hardness at the bottom portion of more than 55 R.

The inventor also investigated about additives capable of reducing the bleeding quantity, and found that, when a definite amount of fatty amide lubricant is combined with a definite amount of surfactant lubricant, the bleeding quantity could be sharply reduced while securing the effect of the lubricant.

Thus, the present invention also provides a container body for a photographic film cartridge composed of propylene-ethylene copolymer resin containing at least 0.005 to 0.3 wt. % of a fatty amide lubricant and 0.005 to 0.6 wt. % of a surfactant lubricant and the sum of said both lubricants being 0.01 to 0.9 wt. %.

Another object of the invention is to provide a container for a photographic film cartridge having a great impact strength and rigidity and low generation of white powder.

The above object has been achieved by balancing of blending between homopolypropylene resin and propylene-ethylene copolymer resin.

Thus, the present invention also provides a container body for a photographic film cartridge, which comprises a blend of homopolypropylene resin and propylene-ethylene copolymer resin at a ratio of 5:95 to 95:5 and more than 0.005 wt. % of a lubricant, having a melt index of 10 to 60 g/10 minutes, a bending elastic modulus of more than 9000 kg/cm$^2$, a notched Izod impact strength at 23° C. of more than 2.5 kg·cm/cm and a Rockwell hardness of more than 85 R.

Another object of the invention is to provide a container for a photographic film cartridge wherein the resin amount is reduced while securing the impact strength, buckling strength and the like.

The above object has been achieved by devising the resin composition and form thereof.

Thus, the present invention also provides a container body for a photographic film cartridge, which comprises a polypropylene resin composition containing more than 70 wt. % of a propylene-α-olefin random copolymer resin having a melt index of 10 to 60 g/10 minutes, having plural grooves 0.1 to 0.7 mm in depth 0.5 to 5 mm in width formed in the longitudinal direction on at least one side of the inner surface or the outer surface of the peripheral wall portion.

Another object of the invention is to provide a container for a photographic film cartridge not generating pinholes or increasing moisture permeability, even when the gate mark portion is scraped upon removal from the mold.

The above object has been achieved by thickening the gate mark portion greater than the neighborhood portions.

BRIEF DESCRIPTION OF THE DRAWINGS

FIGS. 4 and 5 are sectional views of different containers in the state that the cap is detached. FIGS. 6 to 8 are perspective views of further different container bodies.

FIG. 18 is a longitudinally sectional view of an example of thickening the gate mark portion, and FIG. 19 is an enlarged sectional view around the gate mark portion thereof.

FIG. 20 is a longitudinally sectional view of another example of thickening the gate mark portion, and FIG. 21 is an enlarged sectional view around the gate mark portion thereof.

DETAILED DESCRIPTION OF THE INVENTION

Figure 1:
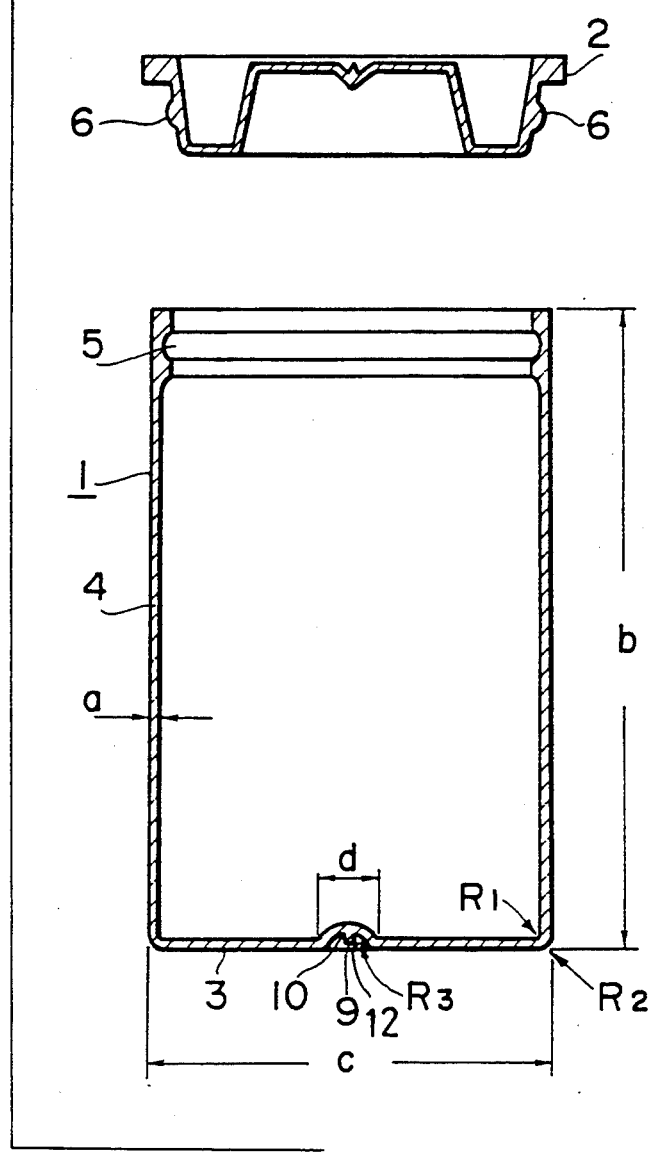
FIG. 1 is longitudinally sectional view of a container for a photographic film cartridge to which the present invention is applicable.

A container body for a photographic film cartridge has a Rockwell hardness (ASTM D-785, R scale) at the bottom portion of more than 55 R. Since the peripheral wall portion is a curved surface, the Rockwell hardness of the peripheral wall portion cannot be measured. However, the peripheral wall portion is supposed to have the same Rockwell hardness as the bottom portion. When the Rockwell hardness at the bottom portion is less than 55 R, the white powder generation increases in quantity.

The Rockwell hardness at the bottom portion can be made more than 55 R by using a resin composition having a Rockwell hardness (ASTM D-785, R scale, the value determined by measuring a sheet 3.2 mm in thickness) of more than 80 R, preferably more than 85

R, and molding at a molding resin temperature of more than 180° C., preferably more than 210° C. However, any other method capable of making the Rockwell hardness at the bottom portion more than 55 R may be employed.

The resin usable for forming the container body for a photographic film cartridge includes various thermoplastic resins, such as homopolypropylene resin, propylene-α-olefin random copolymer resin, propylene-α-olefin block copolymer resin, high density polyethylene resin, high impact polystyrene resin containing synthetic rubber and blended resins of the above resin and various polyolefin resins, such as ethylene-copolymer resin and/or various fillers. A particularly preferred resin is propylene-ethylene random copolymer resin having an ethylene content of 0.5 to 6 wt. %, in view of a suitable rigidity, an excellent transparency and a great impact strength. The resin forming the container body preferably has a melt index (MI, ASTM D-1238) of 10 to 60 g/10 minutes, a bending elastic modulus (ASTM D-790) of more than 9,000 kg/cm$^2$ and a notched Izod impact strength at 23° C. (ASTM D-256) of more than 2.0 kg·cm/cm. When the MI is less than 10 g/10 minutes, molding troubles such as short shot occur. While, when the MI is beyond 60 g/10 minutes, various troubles occur such as deformation of the opening part, decrease of fitting strength, occurrence of cap detachment, deformation during stocking many pieces in a hopper, decrease of moistureproofness, decrease of impact strength, occurrence of burrs, and generation of white powder and scratches by scraping the resin forming the peripheral wall portion of the container body with the leading end of the photographic film due to the decrease of surface strength. When the bending elastic modulus is less than 9,000 kg/cm$^2$, deformation of the opening part and buckling are liable to occur, and therefore, the molding cycle must be elongated. When the notched Izod impact strengh at 23° C. is less than 2.0 kg cm/cm, cracking occurs upon dropping or by impact in processing and packaging processes and physical distribution.

To incorporate more than 0.001 wt. % of a lubricant into the resin forming the container body is preferred in view of improving moldability and the ease of putting in and taking out a photographic film cartridge. When the content of lubricant is less than 0.001 wt. %, buckling occurs during the molding and molding cycle is elongated. Moreover, blocking occurs among the container bodies in processing and packaging processes, resulting in conveying troubles. Static mark trouble and abrasion also occur. Actually, the generation of white powder sharply decreases, even when no lubricant was added. However, molding troubles such as buckling and deformation of the opening part increased about ten times compared with the cases of blending a lubricant in Example I and II. Examples of commercial lubricants suitable for the invention include:

Oleic amide lubricants; "ARMOSLIP-CP" (Lion Akzo Co., Ltd.), "NEWTRON" and "NEWTRON E-18" (Nippon Fine Chemical Co., Ltd.), "AMIDE-0" (Nitto Kagaku K.K.), "DIAMID 0-200" and "DIAMID G-200" (Nippon Kasei Chemical Co., Ltd.), "ALFLOW E-10" (Nippon Oil and Fats Co., Ltd.), etc.

Erucic amide lubricants; "ALFLOW P-10" (Nippon Oil and Fats Co., Ltd.), etc.

Stearic amide lubricants; "ALFLOW S-10" (Nippon Oil and Fats Co., Ltd.), "NEWTRON 2" (Nippon Fine Chemical Co., Ltd.), "DIAMID 200" (Nippon Kasei Chemical Co., Ltd.), etc.

Bis fatty amide lubricants; "BISAMIDE" (Nitto Kagaku K.K.), "DIAMID-200 BIS" (Nippon Kasei Chemical Co., Ltd.), "ARMOWAX-EBS" (Lion Akzo Co., Ltd.), etc.

Silicone lubricants; dimethylpolysiloxanes, modified thereof, etc. (Sinetsu Chemical Co., Ltd., Toray Silicone Co., Ltd.), etc.

Alkylamine lubricants; "ELECTROSTRIPPER TS-2" and "ELECTROSTRIPER TS-3" (Kao Corp.), etc.

Hydrocarbon lubricants; liquid paraffin, natural paraffin, microwax, synthetic paraffin, polyethylene wax, polypropylene wax, chlorinated hydrocarbon, fluorocarbon, etc.

Fatty acid lubricants; higher fatty acids preferably more than $C_{12}$, hydroxy fatty acids, etc.

Ester lubricants; fatty acid lower alcohol esters, fatty acid polyol esters, fatty acid polyglycol esters, fatty acid fatty alcohol esters, etc.

Alcohol lubricants; polyols, polyglycols, polyglycerols, etc.

Metallic soap; metal salts such as Li, Mg, Ca, Sr, Ba, Zn, Cd, Al, Sn, Pb salts of higher fatty acids such as lauric acid, stearic acid, ricinoleic acid naphthenic acid, oleic acid, etc.

To incorporate more than 0.01 wt. % of an organic nucleating agent is preferred in view of improving transparency, shortening of the molding cycle, the prevention of stringiness and resin remaining at gate troubles, the prevention of abrasion and rigidity. When the content of the organic nucleating agent is less than 0.01 wt. %, the blending effect is little. Preferable organic nucleating agents are dibenzylidenesorbitol compounds, and includes di-(p-methylbenzylidene)sorbitol, di-(2,4-dimethylbenzylidene)sorbitol, di-(2,4-diethylbenzylidene)sorbitol, di-(1,3,5-trimethylbenzylidene)-sorbitol, di(pentamethylbenzylidene)sorbitol, 1,3,2,4-di(methylbenzylidene)sorbitol, 1,3-p-ethylbenzylidene-2,4-p-methylbenzylidenesorbitol, 1,3-p-methylbenzylidene-2,4-p-ethylbenzylidenesorbitol, 1,3-p-methylbenzylidene-2,4-p-chlorobenzylidenesorbitol, 1,3-p-chlorobenzylidene-2,4-p-methylbenzylidenesorbitol, 1,3-p-methylbenzylidene-2,4-p-isopropylbenzylidenesorbitol, 1,3-p-isopropylbenzylidene-2,4-p-methylbenzylidenesorbitol, 1,3-p-ethylbenzylidene-2,4-p-isopropylbenzylidenesorbitol, 1,3-p-chlorobenzylidene-2,4-p-isopropylbenzylidenesorbitol, 1,3,2,4-di(ethylbenzylidene)sorbitol, 1,3,2,4-di(propylbenzylidene)sorbitol, 1,3,2,4-di(methoxybenzylidene)sorbitol, 1,3,2,4-di(ethyoxybenzylidene)sorbitol, 1,3,2,4-di-(p-methylbenzylidene)sorbitol, 1,3,2,4-di-(p-chlorobenzylidene)sorbitol, 1,3,2,4-di-(p-methoxybenzylidene)-sorbitol and 1,3,2,4-di(alkylbenzylidene)sorbitol. Two or more of the dibenzylidenesorbitol compounds may be combined. Moreover, the dibenzylidenesorbitol compound may be combined with other organic or inorganic nucleating agents.

To incorporate more than 0.01 wt. % but within the range not generating photographic troubles such as fogging or the deviation in photosensitivity of an antioxidant is preferred in view of preventing resin yellowing. When the content of antioxidant is less than 0.01 wt. %, the blending effect is little. Suitable antioxidants are described below.

Phenol Antioxidants:

6-t-butyl-3-methylphenol derivatives, 2,6-di-t-butyl-p-cresol, 2,2'-methylenebis-(4-ethyl-6-t-butylphenol), 4,4'-butylidenebis(6-t-butyl-m-cresol), 4,4'-thiobis(6-t-butyl-m-cresol), 4,4-dihydroxydiphenylcyclohexane, alkyl group-induced bisphenol, styrene group-induced phenol, 2,6-di-t-butyl-4-methylphenol, n-octadecyl-3-(3',5'-di-t-butyl-4'-hydroxyphenyl)propionate, 2,2'-methylenebis(4-methyl-6-t-butylphenol), 4,4'-thiobis(3-methyl-6-t-butylphenol, 4,4'-butylidenebis(3-methyl-6-t-butylphenol), stearyl-β-(3,5-di-4-butyl-4-hydroxyphenyl)propionate, 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis [methylene-3-(3',5'-di-t-butyl-4'-hydroxyphenyl) propionate]methane, etc.

Ketone-Amine Condensate Antioxidants:
6-ethoxy-2,2,4-trimethyl-1,2-dihydroquinoline, polymers of 2,2,4-trimethyl-1,2-dihydroquinoline, trimethyldihydroquinoline derivatives, etc.

Arylamine Antioxidants:
Phenyl-α-naphthylamine, N-phenyl-β-naphthylamine, N-phenyl-N'-isopropyl-p-phenylenediamine, N,N'-diphenyl-p-phenylenediamine, N,N'-di-p-naphthyl-p-phenylenediamine, N-(3'-hydroxybutylidene)-1-naphtylamine, etc.

Imidazole Antioxidants:
2-mercaptobenzoimidazole, zinc salt of 2-mercaptobenzoimidazole, 2-mercaptomethylbenzoimidazole, etc.

Phosphite Antioxidants:
Alkyl-induced arylphosphite, diphenylisodecylphosphite, sodium phosphite salt of tris(nonylphenyl)phosphite, trinonylphenylphosphite, triphenylphosphite, etc.

Thiourea Antioxidants:
Thiourea derivatives, 1,3-bis(dimethylaminopropyl)-2-thiourea, etc.

Other Antioxidants:
Those useful for air oxidation, such as dilauryl thiodipropionate, etc.

Various additives may be added to the resin composition composing the container body of the invention. Examples of the additives are described below.

(1) Plasticizer; phthalic acid esters, glycol esters, fatty acid esters, phosphoric acid esters, etc.
(2) Stabilizer; lead compounds, cadmium compounds, zinc compounds, alkaline earth metal compounds, organic tin compounds, etc.
(3) Antistatic agent; cationic surfactants, anionic surfactants, nonionic surfactants, ampholytic surfactants, etc.
(4) Flame retardant; phosphoric acid esters, phosphoric acid ester halides, halides, inorganic materials, polyols containing phosphor, etc.
(5) Filler; alumina, kaolin, clay, calcium carbonate, mica, talc, titanium dioxide, silica, etc.
(6) Reinforcing agent; glass lobing, metallic fiber, glass fiber, glass milled fiber, carbon fiber, etc.
(7) Vulcanizing agent; vulcanization accelerator, acceleration assistant, etc.
(8) Deterioration preventing agent; ultraviolet absorber, metal deactivator, peroxide decomposing agent, etc.
(9) Coupling agent; silane compounds, titanium compounds, chromium compounds, aluminum compounds, etc.
(10) Various thermoplastic resins, elastomers, rubbers, etc.

In the above container body of the invention, bleeding of various additives is prevented by rendering the Rockwell hardness at the bottom portion more than 55 R, and thereby, the generation of white powder is decreased.

A container body for a photographic film cartridge is composed of propylene-ethylene copolymer resin containing at least 0.005 to 0.3 wt. % of a fatty amide lubricant and 0.005 to 0.6 wt. % of a surfactant lubricant and the sum of said both lubricants being 0.01 to 0.9 wt. %.

The resin composition forming the above container body contains more than 70 wt. % of propylene-ethylene random copolymer resin having an ethylene content of 1 to 5 wt. %, a melt index (MI, ASTM D-1238) of 10 to 60 g/10 minutes and a bending elastic modulus (ASTM D-790) of more than 9,000 kg/cm$^2$. When the content of the above propylene-ethylene random copolymer is less than 70 wt. %, various disadvantages appear such as reduction of transparency, degradation of the balance among various physical strengths and degradation of injection moldability. When the ethylene content is less than 1 wt. %, impact strength is small, and blending effect of lubricant and surfactant is low. While, when the ethylene content is beyond 5 wt. %, deformation and molding troubles such as buckling, stringiness and drooling frequently occur. When the MI is less than 10 g/10 minutes, molding troubles such as short shot frequently occur. While, when the MI is beyond 60 g/10 minutes, burrs occur and impact strength and surface strength are low. When the bending elastic modulus is less than 9,000 kg/cm$^2$, bleeding out significant quantities of additives occur. Deformation and buckling are liable to occur. There are block-type propylene-ethylene copolymer resins as well as the above random-type. The block-type resin is excellent in impact strength. However, it is inferior in whitening by impact and transparency, and therefore, it is not desirable as the principal resin for the container body of the invention. Homopolypropylene resin is insufficient in impact strength and inferior in transparency, and therefore, it is also not suitable as the principal resin for the container body of the invention.

The fatty amide lubricant is incorporated in order to shorten molding cycle, to prevent static marks, to prevent blocking and the like. Suitable fatty amide lubricants are saturated fatty amide lubricants such as behenic amide lubricant, stearic amide lubricant, palmitic amide lubricant and lauric amide lubricant, unsaturated fatty amide lubricants such as erucic amide lubricant and oleic amide lubricant, bis fatty amide lubricants such as methylenebisbehenic amide lubricant, methylenebisstearic amide lubricant, methylenebisoleic amide lubricant, ethylenebisstearic amide lubricant, hexamethylenebisstearic amide lubricant and hexamethylenebisoleic amide lubricant, monoalkylolamide lubricants such as N-(2-hydroxyethyl)lauric amide lubricant, N-(2-hydroxyethyl)stearic amide lubricant and N-(2-hydroxymethyl)stearic amide lubricant. They are commerically available from Nippon Kasei Chemical Co., Ltd., Lion Akzo Co., Ltd., Nippon Oil and Fats Co., Ltd., Kao Corp., Nitto Kagaku K.K., Nippon Fine Chemical Co., Ltd., I.C.I., Kawaken Fine Chemicals Co., Ltd., Toho Chemical Ind. Co., Ltd., and the like. The content of the fatty amide lubricant is 0.005 to 0.3 wt. %, preferably 0.02 to 0.2 wt. %. When the content is less than 0.005 wt. %, the blending effects, such as the improvement in slipping character, antiblocking ability and, antistatic ability and shortening of molding cycle, are insufficient. While, when the content is beyond 0.3 wt. %, the amount of additives which bleed out gradually increases resulting to increase white powder generation and to decrease transparency.

The surfactant lubricant prevents white powder generation together with the fatty amide lubricant, and improves the dispersibility and solubility of additives. It imparts conductivity to improve antistatic ability, and decreases unfavorable odor of the benzylidenesorbitol compound used as an nucleating agent. Suitable surfactant lubricants are nonionic surfactants such as partial fatty acid esters of polyols, ethylene oxide adducts of fatty alcohols, ethylene oxide adducts of fatty acids, ethylene oxide adducts of fatty amino compounds or fatty amides, ethylene oxide adducts of alkylphenols, ethylene oxide adducts of alkylnaphthols, ethylene oxide adducts of partial fatty acid esters of polyols and polyethylene glycols, cationic surfactants such as primary amine salts, tertiary amine salts, quaternary ammonium salts, pyridine derivatives and urea derivatives, anionic surfactants such as sulfated oils, soaps, sulfated ester oils, sulfated amide oils, sulfate ester salts of olefins, sulfate ester salts of fatty alcohols, alkyl sulfate ester salts, fatty acid ethyl sulfonate salts, alkyl sulfonates, alkyl benzene sulfonates, mixtures of naphthalene sulfonates and formalin, succinate ester sulfonate salts and phosphate ester salts, and ampholytic surfactants such as carboxylic acid derivatives and imidazoline derivatives. They are commercially available from Marubishi Oil Chemical Co., Ltd., Matsumoto Yushi Seiyaku Co., Ltd., Kao Corp., Dai-ichi Kogyo Seiyaku Co., Ltd., Nippon Oil and Fats Co., ltd., Sanyo Chemical Ind. Ltd., Yoshimura Oil Chemical Co., Ltd., American Cyanamide Co., Fine Org. Chem., General Aniline Film, and the like. The content of the surfactant lubricant is 0.005 to 0.6 wt. %, preferably 0.05 to 0.5 wt. %. When the content is less than 0.005 wt. %, the blending effects, such as the improvement in slipping character and antistatic ability with suppression of the increase of white powder generation, are insufficient. While, when the content is beyond 0.6 wt. %, the amount of additives which bleed out induce development troubles of the photographic film placed therein.

The sum of the fatty amide lubricant and the surfactant lubricant is 0.01 to 0.9 wt. %, preferably 0.07 to 0.7 wt. %. When the content is less than 0.01 wt. %, the blending effects, such as the improvement in slipping character, moldability and antistatic ability, are insufficient. While, when the content is beyond 0.9 wt. %, a significant amount of additives bleed out. Screw slip occurs, and white powder generation increases. Transparency gradually decreases, and development trouble occurs in the photographic film placed therein by the adhesion of the lubricants or the like.

Other lubricants may be added in order to improve extruding ability, injection moldability or antistatic ability. Suitable lubricants are silicone lubricants, alkylamine lubricants, hydrocarbon lubricants, fatty acid lubricants, ester lubricants, alcohol lubricants and metallic soaps, mentioned previously.

To incorporate 0.01 to 1 wt. % of an organic nucleating agent is preferred in view of improving transparency, physical strength, rigidity and the like. Preferable organic nucleating agents are dibenzylidenesorbitol compounds including those mentioned previously. Two or more of the dibenzylidenesorbitol compounds may be combined, and while, the dibenzylidenesorbitol compound may be combined with other organic or inorganic nucleating agents, transparency is improved by adding the dibenzylidenesorbitol compound.

To incorporate 0.01 to 1 wt. % of an antioxidant is preferred in view of efficient continuous molding. Suitable antioxidants are phenol antioxidants, ketone-amine condensate antioxidants, arylamine antioxidants, imidazole antioxidants, phosphite antioxidants, thiourea antioxidants and other antioxidants, mentioned previously.

Various additives may be added to the resin composition composing the container body of the invention. Examples of the additives are aforementioned plasticizers, stabilizers, flame retardants, fillers, reinforcing agents, vulcanizing agents, deterioration preventing agents, coupling agents, various thermoplastic resins, elastomers and rubbers, and coloring agents such as inorganic pigments, e.g. carbon black, Al, $Fe_2O_3$, $TiO_2$, ZrO and CdS, organic pigments and dyes.

In the above container body of the invention, bleeding of various additives is prevented by a particular combination of two kinds of lubricants and a particular resin, and thereby, the generation of white powder is decreased.

A container body for a photographic film cartridge comprises a blend of homopolypropylene resin and propylene-ethylene copolymer resin at a ratio by weight of 5:95 to 95:5 and more than 0.005 wt. % of a lubricant, and has a melt index of 10 to 60 g/10 minutes, a bending elastic modulus of more than 9000 kg/cm$^2$, a notched Izod impact strength at 23° C. of more than 2.5 kg·cm/cm and a Rockwell hardness of more than 85 R.

When the ratio of homopolypropylene resin is less than 5, i.e. propylene-ethylene copolymer resin is beyond 95, it is difficult to provide a container body having a great rigidity, a great impact strength, a high crystallinity, low occurrence of opening part deformation and buckling, and little increase of the amount of additives bled out with time. While, when the ratio of homopolypropylene resin is beyond 95, i.e. propylene-ethylene copolymer resin is less than 5, impact strength is small, and cracks occur upon dropping. Particularly, the container body easily cracks at temperatures lower than the freezing point of water. Haze is also great. Besides, when the propylene-ethylene copolymer resin used is propylene-ethylene block copolymer resin which is readily whitened by pressure or impact, which has a small surface strength and on which abrasion and white powder are readily generated, the content of the block copolymer resin is preferably 5 to 70 wt. %, more preferably 10 to 50 wt. % further more preferably 15 to 40 wt. %. By employing the above content, the disadvantages are solved, and a container body having a sufficient impact strength can be obtained.

Homopolypropylene resin is easy in the polymerization process and inexpensive. Moreover, it is excellent in rigidity, surface strength and injection moldability. While, it is inferior in impact strength and transparency, and therefore, it is unsuitable as the single resin for the container body of the invention requiring moistrueproofness and gas barrier properties.

Propylene-ethylene copolymer resin is produced by the polymerization in a saturated hydrocarbon solvent using a composite catalyst of titanium tetrachloride and triethyl aluminum called Ziegler catalyst, the polymerization using a composite catalyst of titanium trichloride and triethyl aluminum called Natta catalyst, Standard Oil process, Phillips process, Sun Oil process or the like, and the copolymer resin can be used for the container body of the invention irrespective of the polymerization process. Preferable propylene-ethylene copolymer resins have an ethylene content of 1 to 30 wt. %, preferably 2 to 15 wt. %, and propylene-ethylene random copolymer resins having a propylene content of 70 to 99 wt. %, preferably 85 to 98 wt. % and an ethylene content of 1 to 30 wt. %, preferably 2 to 15 wt. % are particularly preferred. By blending propylene-ethylene copolymer resin having an ethylene content of 1 to 30 wt. % with homopolypropylene resin having a high bending elastic modulus, a great Rockwell hardness and a small Izod impact strength, all properties necessary for container bodies for a photographic film cartridge can be made within a practical limit in any place of the world. Moreover, molding troubles and white powder generation are low, and the molding cycle can be shortened.

It is preferable that more than 80 wt. % of the blend is the homopolypropylene and the propylene-ethylene copolymer.

The lubricant facilitates the placement of a photographic film cartridge in and out, decreases static electrification, prevents blocking and improves moldability. The content of the lubricant is more than 0.005 wt. %, preferably more than 0.02 wt. %. When the content is less than 0.005 wt. %, the blending effects are insufficient. While, the content of the lubricant is preferably less than 5 wt. %, more preferably less than 1 wt. %. When the content is beyond 5 wt. %, screw slip occurs between the screw of extruder and the resin, and the blendability is degraded, even in the case of fatty acid lubricant or fatty acid metal salt lubricant having a small effect on the improvement of slipping character. In the case of fatty amide lubricant having a great ability of improving slipping character and being liable to induce bleeding, a suitable content is 0.005 to 1 wt. % in order to avoid screw slip, adhesion of dust by the bleeding out and white powder generation, and 0.05 to 0.5 wt. % is particularly preferred. Suitable lubricants are silicone lubricants, oleic amide lubricants, erucic amide lubricants, stearic amide lubricants, bis fatty amide lubricants, alkylamine lubricants, hydrocarbon lubricants, fatty acid lubricants, ester lubricants, alcohol lubricants and metallic soaps, mentioned previously.

The blend for forming a container body of the invention has a melt index (ASTM D-1238) of 10 to 60 g/10 minutes. When the MI is less than 10 g/10 minutes, the resin fluidity is inferior. As a result, injection pressure is raised, and short shot occurs. While, when the MI is beyond 60 g/10 minutes, the rigidity is low. As a result, fitting strength decreases to degrade moistureproofness and to induce cap detachment problems. Moreover, opening part deformation, buckling and molding troubles such as burrs are liable to occur. The bending elastic modulus (ASTM D-790) is more than 9,000 kg/cm$^2$. When the bending elastic modulus is less than 9,000 kg/cm$^2$, fitting strength decreases to degrade moistureproofness and to induce cap detachment. Moreover, opening part deformation and buckling are liable to occur, and the molding cycle is elongated. The notched Izod impact strength (ASTM D-256) at 23° C. is more than 2.5 kg·cm/cm. When the notched Izod impact strength is less than 2.5 kg·cm/cm, cracking occurs at the dropping lower than the freezing point or impact during physical distribution. The Rockwell hardness (ASTM D-785) is more than 85 R. When the Rockwell hardness is less than 85 R, white powder is generated by the gradual bleeding out of additives, and abrasion is liable to occur.

The container body of the invention may contain various additives, such as nucleating agent, antioxidant, surfactant, coloring agent, coupling agent and the like.

The nucleating agent is added for the aim of improving crystallization rate, shortening molding cycle, preventing deformation of the container body and white powder generation, improving physical properties and the like. That is, by increasing rigidity and elevating the crystallization temperature, cooling time can be shortened without forming a bottom sink mark and buckling, and a great quantity of molded container bodies can be put into a hopper or a container box without deformation immediately after molding. Moreover, Rockwell hardness and wear resistance can be sharply improved, and a great effect is exhibited on the prevention of white powder generation in a high speed processing and packaging process or air conveying process. There are organic nucleating agents and inorganic nucleating agents, and organic nucleating agents, particularly dibenzylidenesorbitol compounds described previously are preferred. Inorganic nucleating agents include alkali metal hydroxides such as lithium hydroxide, sodium hydroxide and potassium hydroxide, alkali metal oxides such as disodium oxide, alkali metal carbonates such as lithium carbonate, sodium carbonate, potassium carbonate, sodium hydrogen carbonate and potassium hydrogen carbonate, alkaline earth metal hydroxides such as calcium hydroxide, magnesium hydroxide and barium hydroxide, alkaline earth metal oxides such as calcium oxide and alkaline earth metal carbonates such as calcium carbonate. The nucleating agent may be an organic nucleating agent alone, a combination of an organic nucleating agent and an inorganic nucleating agent or a combination of two or more organic nucleating agents. It is preferable to coat the surface of the organic nucleating agent with a fatty acid, a fatty acid compound, a coupling agent, a surfactant or the like. A suitable content of organic nucleating agent is 0.01 to 1 wt. %. When the content is less than 0.01 wt. %, the blending effect is insufficient. While, when the content is beyond 1 wt. %, a further effect does not appear. According to the kind of nucleating agent, the excess amount induces various disadvantages such as an adverse affect upon photographic film, adhesion to mold, bleeding out and sharp decrease of dropping strength. As the method of blending organic nucleating agent, there are compound method, dry blending method, masterbatch method and the like, and the masterbatch method is preferred. Since most of organic nucleating agents are bulky and liable to be scattered it is preferable to blend a small amount of dispersing agent or wetting agent. Suitable dispersing agents include carboxylic anhydrides and higher fatty acids, and lubricants such as oleic amide are particularly preferred. Suitable wetting agents include plasticizers such as DOP and DHP.

To blend a coupling agent is preferred in view of removing the unfavorable odor of the organic nucleating agent. Suitable coupling agents include silane compound coupling agents such as vinylsilane coupling agents, acrylsilane coupling agents, epoxy silane coupling agents, aminosilane coupling agents and mercaptosilane coupling agents, titanium compound coupling agents, chromium compound coupling agents and aluminum compound coupling agents. A suitable content of the coupling agent is 0.01 to 5 wt. %.

To incorporate 0.01 to 1 wt. % of an antioxidant is preferred in view of efficient continuous molding. Suitable antioxidants are phenol antioxidants, ketone-amine condensate antioxidants, arylamine antioxidants, imidazole antioxidants, phosphite antioxidants, thiourea antioxidants and other antioxidants, mentioned previously. Sulfur antioxidants are also usable, and include dilaurylthiodipropionate, dimyristylthiodipropionate, laurylstearylthiodipropionate, distearylthiodipropionate, etc.

A surfactant can be incorporated in order to improve antistatic ability and the like.

Suitable surfactants are:

Nonionic surfactants; polyethylene glycol fatty acid esters, polyoxyethylene sorbitan fatty acid esters, polyoxyethylene fatty alcohol ethers, polyoxyethylene alkylphenyl ethers, polyoxyethylene glycerine fatty acid esters, polyoxyethylene fatty amines, sorbitan monofatty acid esters, fatty acid pentaerythritol, ethylene oxide adducts of fatty alcohols, ethylene oxide adducts of fatty acids, ethylene oxide adducts of amino fatty acids or fatty acid amides, ethylene oxide adducts of alkylphenols, ethylene oxide adducts of alkylnaththols, ethylene oxide adducts of partial fatty acid esters of polyols, other nonionic surfactants disclosed on page 120 of Japanese Patent KOKOKU No. 63-26697.

Anionic surfactants; sodium salt of ricinoleic acid sulfate ester, various metal salts of fatty acids, ricinolate ester sulfate ester sodium salt, sulfated ethylaniline oleate, sulfate esters of olefins, sodium salt of oleyl alcohol sulfate ester, alkylsulfate ester salts, fatty acid ethylsulfonate salts, alkylsulfonate salts, alkyl naththalene sulfonate salts, alkylbenzene sulfonate salts, succinate ester sulfonate salts, phosphate ester salts, etc.

Cationic surfactants; primary amine salts, tertiary amine salts, quaternary ammonium salts, pyridine derivatives, etc.

Ampholytic surfactants; carboxylic acid derivatives, imidazoline derivatives, betaine derivatives, etc.

Nonionic surfactants and cationic surfactants are preferred, because of not affecting the photographic film adversely and of preventing the generation of static electricity. A suitable content of the surfactant is 0.01 to 5 wt. %. When the content is less than 0.01 wt. %, the blending effect of the surfactant is insufficient. While, when the content is beyond 5 wt. %, the increase of the blending effect is not so much by increasing the blending quantity of the surfactant. Moreover, an excess amount of the surfactant causes various troubles, such as an adverse influence upon photographic film, adhesion of dust caused by bleeding out and decrease of transparency, according to the kind of the surfactant.

A coloring material may be added. Examples of the coloring materials are described below.

Inorganic Compounds:

Oxides . . . silica, diatomaceous earth, alumina, titanium oxide, iron oxide, zinc oxide, magnesium oxide, antimony oxide, barium ferrite, strontium ferrite, beryllium oxide, pumice, pumice balloon, alumina fiber, etc.

Hydroxides . . . aluminum hydroxides, magnesium hydroxides, basic magnesium carbonate, etc.

Carbonates . . . calcium carbonate, magnesium carbonate, dolomite, etc.

Sulfates, sulfites . . . calcium sulfate, barium sulfate, ammonium sulfate, calcium sulfite, etc.

Silicates . . . talc, clay, mica, asbestos, glass fiber, glass balloon, glass bead, calcium silicate, montmorillonite, bentonite, etc.

Carbons . . . carbon black, graphite, carbon fiber, carbon hollow bead, etc.

Others . . . iron powder, copper powder, lead powder, stainless steel powder, pearl pigment, aluminum powder, molybdenum sulfide, boron fiber, silcon carbide fiber, brass fiber, potassium titanate, lead titanate zirconate, zinc borate, barium metaborate, calcium borate, sodium borate, aluminum paste, etc.

Organic Compounds:

wood flour such as pine, oak and sawdust, husk fiber such as almond, peanut and chaff, various colored fibers such as cotton and jute, paper, cellophane, nylon fiber, polypropylene fiber, starch, aromatic polyamide fiber, etc.

Among them, preferred coloring materials impart opacity, and light-absorptive carbon black, titanium nitride and graphite and light-reflective aluminum powder and aluminum paste are particularly preferred because of being excellent in heat resistance and light resistance and being relatively inactive.

Various additives may be added to the resin composition composing the container body of the invention. Examples of the additives are aforementioned plasticizers, stabilizers, flame retardants, fillers, reinforcing agents, vulcanizing agents, deterioration preventing agents, various thermoplastic resins, elastomers and rubbers. Polyolefin thermoplastic resins are particularly preferred.

In the above container body of the invention, the resin amount forming it is saved while securing dropping strength, buckling strength, impact strength, rigidity and the like by devising a combination of a particular resin composition with a particular shape.

A container body for a photographic film cartridge comprises a polypropylene resin composition containing more than 70 wt. % of a propylene-α-olefin random copolymer resin having a melt flow rate of 10 to 60 g/10 minutes, having plural grooves 0.1 to 0.7 mm in depth 0.5 to 5 mm in width formed in the longitudinal direction on at least one side of the inner surface or the outer surface of the peripheral wall portion. Such a container body was completed by various investigations that, when the resin amount is equal, buckling strength of container bodies having indented lateral sections at the peripheral wall portion is greater than that of a flat one having an uniform thickness like shown in FIG. 1. Besides, the prior container body having a roughed surface was made in order to form microspaces so as to facilitate taking the molded container body out of the mold. Therefore, the roughness is not necessary grooves in the longitudinal direction, and the roughness is enough to be extremely small. As a result, the resin amount and the buckling strength are almost the same as the conventional one. The present inventor has examined an optimum balance between the resin amount used and the buckling strength as to various forms and sizes of the roughness, and completed the present invention.

The grooves are formed on at least one side of the inner surface or the outer surface of the peripheral wall portion. The preferred side is the inner surface because when the grooves are formed on the inner surface, the leading end of the photographic film being out of the cartridge is engaged with the groove to suppress the rotation of the cartridge. Therefore, the container body is not scraped by the leading end. Moreover, the grooves formed on the inner surface facilitate taking out of the core of the mold. The grooves have a depth of 0.1 to 0.7 mm and a width of 0.5 to 5 mm. Suitable sizes of respective grooves are set in view of impact strength, rigidity and the like, within the above ranges. When the depth is less than 0.1 mm, not only the effect of saving resin amount cannot be obtained, but also the price of the mold is expensive. While, when the depth is beyond 0.7 mm, it is difficult to satisfy the requirements of both impact strength and buckling strength, even by using a preferable propylene-α-olefin random copolymer where the content of α-olefin such as ethylene is controlled. When the width is less than 0.5 mm, the form of the grooves becomes irregular by the gradual abrasion of the mold. As a result, the cartridge placed in the container rotates to produce white powder. While, when the width is beyond 5 mm, buckling is liable to occur. Moreover, the difference of impact strength is great at the boundary portion between a thickened portion and a thinned portion, and cracks occur by the dropping or collision during air conveying. The grooves are plural, and formed in the longitudinal direction. By this arrangement, the occurrence of buckling decreases at the taking out of the core of the mold, and resin fluidity is also improved. It is preferred that each groove has a same size and form and is disposed at a regular interval, in view of resin fluidity, prevention of buckling, appearance and the like.

The container body is formed of a polypropylene resin composition containing more than 70wt. % of a propylene-α-olefin random copolymer resin having a melt index (MI, ASTM D-1238) of 10 to 60 g/10 minutes. By using the polypropylene resin composition, a sufficient impact strength is obtained, and the container body of the invention can be achieved. That is, when a homopolypropylene resin having a MI of about 9 g/10 minutes was used, cracks occurred upon dropping. While, when a propylene-α-olefin block copolymer resin was used, whitening by impact occurred, and transparency was reduced. When the content of the propylene-α-olefin random copolymer resin is less than 70 wt. %, it is difficult to produce a container body for a photographic film cartridge satisfying all necessary properties, even though blending is devised such as using homopolypropylene resin, propylene-α-olefin block copolymer resin, ethylene-α-olefin copolymer resin or various polyethylene resins or various additives. Preferred propylene-α-olefin random copolymer has an α-olefin content of 1 to 7 wt. %, i.e. propylene content of 93 to 99 wt. %. Preferable α-olefin has a number of carbon atoms of 2 to 10, such as butene-1, hexene-1 or 4-methylpentene-1, and ethylene is the most preferred. When the MI is less than 10 g/10 minutes, molecules are liable to be arranged in the longitudinal direction resulting in the generation of cracks. In the case that the thickness is thin, molding troubles such as short shot frequently occur, and the molding cycle is elongated. While, when the MI is beyond 60 g/10 minutes, cracking occurs due to low molecular weight. Rigidity is insufficient, and buckling or deformation during storage occur. White powder is also liable to be generated. Moreover, it is preferred that the propylene-α-olefin random copolymer resin has a bending elastic modulus (ASTM D-790) of more than 8,000 kg/cm² and a notched Izod impact strength (ASTM D-256) at 23° C. of more than 2.0 kg·cm/cm, particularly more than 3.0 kg·cm/cm.

The polypropylene resin composition may contain other thermoplastic resins. Suitable thermoplastic resins are low density polyethylene resin, medium density polyethylene resin, high density polyethylene resin, ethylene-ethyl acrylate copolymer resin, ethylene-α-olefin copolymer resins preferably linear low density polyethylene resin of which α-olefin has a number of carbon atoms of 3 to 10 such as propylene, butene-1, hexene-1, 4-methylpentene-1 or octene-1, homopolypropylene resin, propylene-α-olefin block copolymer resins, elastomer resin, synthetic rubbers, modified polyolefin resins including graft-modified resins, and the like.

To incorporate 0.005 to 5 wt. % of a lubricant is preferred in view of improving extruding ability, film moldability and the like. In the case of fatty amide lubricant having a great ability of improving slipping character and being liable to induce bleeding out, a suitable content is 0.001 to 0.5 wt. %. Suitable lubricants are silicone lubricants, oleic amide lubricants, erucic amide lubricants, stearic amide lubricants, bis fatty amide lubricants, alkylamine lubricants, hydrocarbon lubricants, fatty acid lubricants, ester lubricants, alcohol lubricants and metallic soaps, mentioned previously.

To incorporate an organic nucleating agent is preferred in view of improving rigidity and the like. Preferable organic nucleating agents are dibenzylidenesorbitol compounds including those mentioned previously. Two or more of the dibenzylidenesorbitol compounds may be combined, and, the dibenzylidenesorbitol compound may also be combined with other organic or inorganic nucleating agents.

Various additives may be added to the resin composition composing the container body of the invention. Examples of the additives are the previously mentioned plasticizers, stabilizers, flame retardants, fillers, reinforcing agents, vulcanizing agents, deterioration preventing agents, coupling agents, various thermoplastic resins, elastomers and rubbers, and blowing agents such as inorganic blowing agents, e.g. ammonium carbonate sodium hydrogen carbonate, and organic nucleating agents, e.g. nitroso compounds, and azo compounds.

Figure 9:
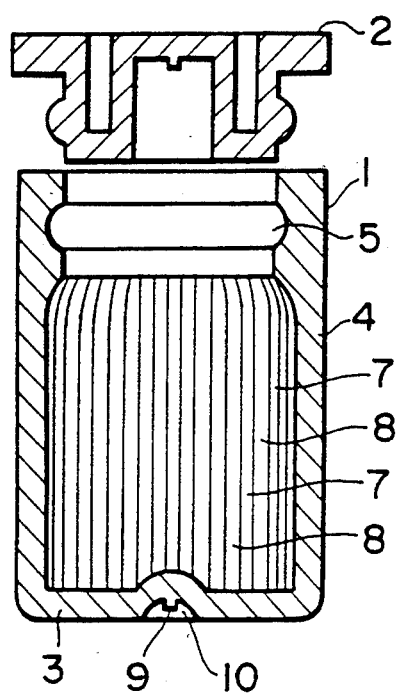
FIG. 9 is a longitudinally sectional view of a container for a photographic film cartridge of an example forming plural grooves.
Figure 10:
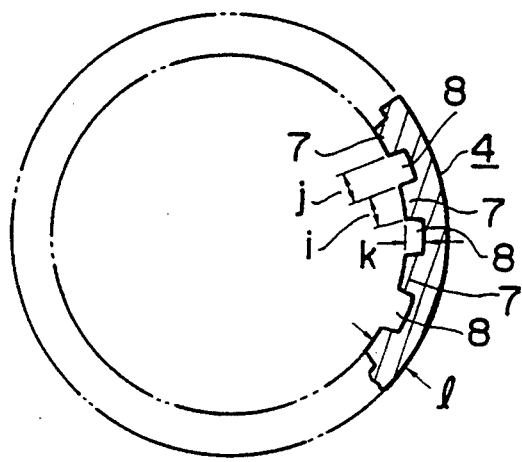
FIG. 10 is a partially laterally sectional view thereof.

An embodiment of the container body of the invention is shown in FIGS. 9 and 10. The container body is similar to illustrated in FIG. 1. Square grooves 8 are formed on the inner surface of the peripheral wall portion in parallel in the longitudinal direction at regular intervals, and the remaining portions form ribs 7.

Figure 11:
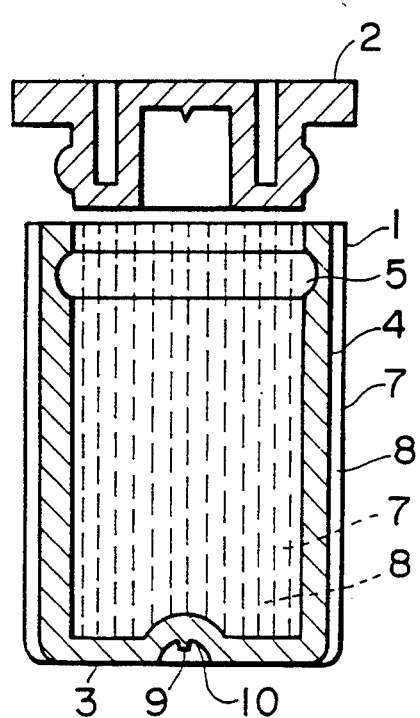
FIG. 11 is a longitudinally sectional view of a container for a photographic film cartridge of another example forming plural grooves.
Figure 12:
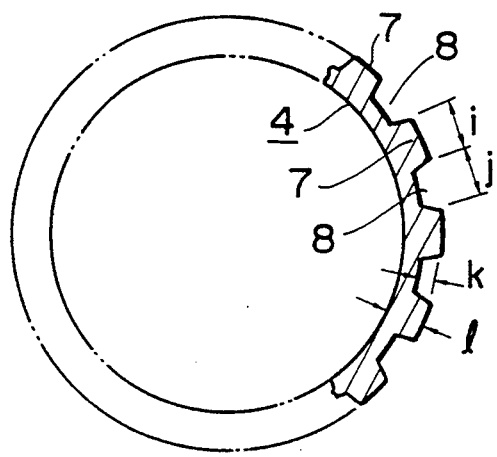
FIG. 12 is a partially laterally sectional view thereof.

Another embodiment is shown in FIGS. 11 and 12. The container body is the same as the above embodiment, except that the thickness of the opening part (upper end) is the same as the other peripheral wall portion, and ribs 7 and grooves 8 are formed on the outer surface of the peripheral wall portion in parallel in the longitudinal direction.

Figure 13:
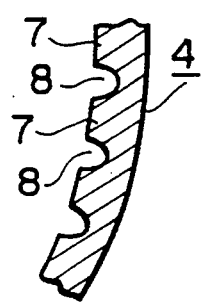
FIG. 13 to 16 are partially laterally sectional views indicating other examples forming plural grooves.
Figure 14:
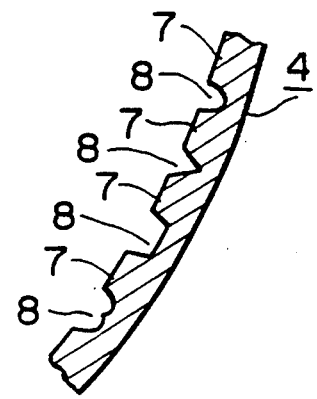
Figure 15:
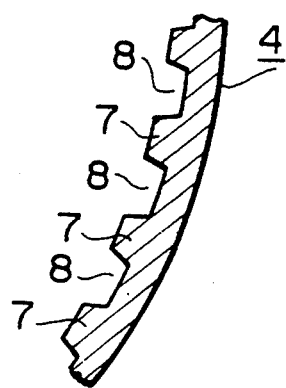
Figure 16:
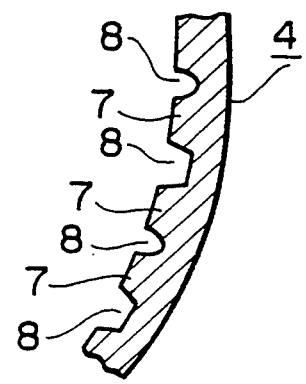

Some other embodiments are shown in FIGS. 13 through 16. In the embodiment of FIG. 13, the grooves 8 have a round section, and FIG. 14 illustrates some other forms of the groove, such as a round section, a triangular section, trapezoidal section and W-shape section. In the embodiment of FIG. 15, two kinds of grooves, i.e. wide grooves and narrow grooves, and two kinds of ribs, i.e. wide ribs and narrow ribs, are formed alternately. In the embodiment of FIG. 16, grooves 8 having a round section and grooves 8 having a trapezoidal section are formed alternately.

Figure 17:
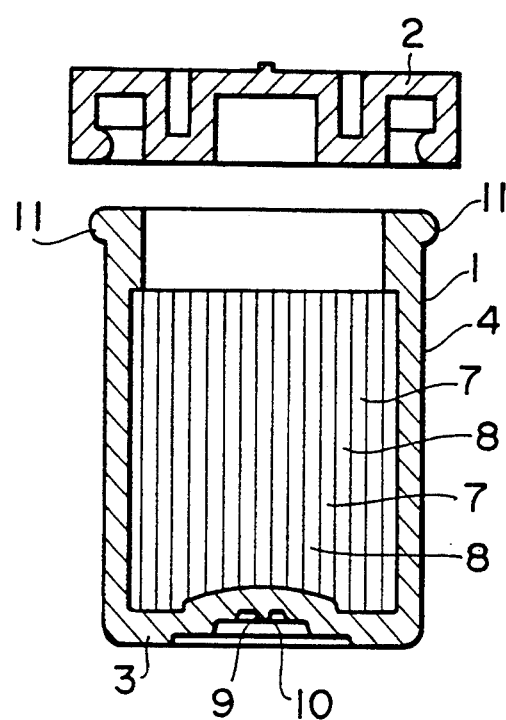
FIG. 17 is a longitudinally sectional view of still another example forming plural grooves.

Still another embodiment is shown in FIG. 17. In this embodiment, cap 2 is fitted so as to surround three sides of the opening portion of the container body 1, and grooves 8 similar to FIGS. 9 and 10 are formed on the inner surface of the peripheral wall portion 4.

The above container body of the invention has high rigidity and is excellent in injection moldability, and deformation such as bottom sink mark, deformation of opening part and buckling rarely occur. Molding troubles also rarely occur, and the molding cycle can sharply be shortened. Surface wear resistance is great, and slipping character is good. Bleeding out of additives is low, and white powder rarely adheres to the leading end of a photographic film. Impact strength is high in spite of having a great rigidity. The container body is excellent in transparency and moistureproofness.

A container body for a photographic film cartridge comprises thickening the gate mark portion greater than the neighborhood portions.

By the thickening, the thickness necessary for securing moistureproofness can be left, even when the gate mark portion is scraped. Therefore, the thick form may be any form capable of achieving the above object. Preferred forms include semisphere and semiellipsoid in view of decreasing flow marks and weld marks. The resin injection portion is usually formed in the least thickness capable of preventing the occurrence of pinholes and securing moistureproofness in order to shorten the molding cycle and to reduce manufacturing cost. Therefore, the thickness of the thickened portion preferably corresponds to the greatest depth by the expected scraping. A suitable thickness of the gate mark portion is thicker than the neighborhood by more than 10 %, preferably 30 to 150 %, further preferably 50 to 100 %. For example, the thickness of the thickened gate mark portion (indicated by p in FIG. 19) is 0.5 to 2.5 mm, preferably 0.7 to 21 mm, further preferably 1 to 1.6 mm.

The position of resin injection portion may be any part of the bottom portion, however, the vicinity of the center portion is the most preferable in terms of fluid balance of resin and prevention of burrs and short shot. Moreover, since a gate mark projects from the bottom portion, the gate mark portion is preferably recessed 0.5 to 5 mm, preferably 1 to 3 mm.

The container body may be composed of various conventional resin compositions. However, polystyrene resin compositions are unpreferable because of insufficient moistureproofness and impact strength and increase of weight due to heavy specific gravity. Polyolefin resin compositions having a MI of less than 10 g/10 minutes are also unpreferable because of short shot, resin remaining at gate portion, bottom sink mark, elongated molding cycle and the like. Preferred resin compositions include polyolefin resin compositions containing more than 70 wt. % of a polyolefin resin having a MI of 10 to 60 g/10 minutes.

In the case of colored container bodies blended with various coloring materials and fillers, suitable resin compositions include the polyolefin resin compositions containing more than 70 wt. % in the sum of medium density polyethylene resin, high density polyethylene resin, homopolypropylene resin, propylene-α-olefin block or random copolymer resins and ethylene-α-olefin copolymer resins. While, in the case of transparent container bodies, they have various disadvantages compared with the resin composition containing fillers, such as low impact strength, low slipping character, occurrence of blocking, static electrification and conspicuous whitening. Therefore, suitable resin compositions are polypropylene resin composition containing more than 50 wt. % of propylene-α-olefin random copolymer resin, blend resin compositions of homopolypropylene resin with ethylene-α-olefin copolymer resin, polypropylene resin compositions containing less than 50 wt. % of propylene-α-olefin copolymer resin.

Preferred resin compositions are disclosed in U.S. Pat. No. 4,639,386, Japanese Patent KOKAI Nos. 61-73947, 63-204252 and 64-9445, Japanese Utility Model KOKAI Nos. 61-182543 and 62-57256 and Japanese Utility Model Application No. 63-158985. Particularly preferable resin compositions contain more than 70 wt. % of propylene-ethylene copolymer resin having a MI of 20 to 45 g/10 minutes, a bending elastic modulus of more than 9,000 kg/cm$^2$, a notched Izod impact strength of more than 2.5 kg·cm/cm and a Rockwell hardness of more than 80 R, and which contain at least one of lubricant and surfactant. To incorporate an organic or inorganic nucleating agent into the above polypropylene resin compositions is preferred because of improving transparency, shortening the molding cycle, improving rigidity and the like. The propylene-ethylene copolymer resins include those produced by using a Ziegler catalyst or a Natta catalyst, Standard Oil process, Phillips process, Sun Oil process or the like, mentioned previously.

To incorporate a lubricant is preferred. Suitable lubricants are silicone lubricants, oleic amide lubricants, erucic amide lubricants, stearic amide lubricants, bis fatty amide lubricants, alkylamine lubricants, hydrocarbon lubricants, fatty acid lubricants, ester lubricants, alcohol lubricants and metallic soaps, mentioned previously.

To incorporate a surfactant is preferred. Suitable surfactants are the nonionic surfactants, the anionic surfactants, the cationic surfactants and the ampholytic surfactants, mentioned in the case of the container body characterized by the blend of homopolypropylene resin and propylene-ethylene copolymer resin. Nonionic surfactants and cationic surfactants are preferred, because of not affecting photographic film adversely and of preventing the generation of static electricity. A suitable content of the surfactant is 0.01 to 1.5 wt. %. When the content is less than 0.01 wt. %, the blending effect of the surfactant is insufficient. While, when the content is beyond 1.5 wt. %, the increase of the blending effect is not so much by increasing the blending quantity of the surfactant. Moreover, the excess amount of the surfactant causes various troubles, such as an adverse influence upon photographic film, adhesion of dust caused by bleeding out and decrease of transparency, according to the kind of the surfactant.

To incorporate a nucleating agent is preferred for the aim of improving crystallization rate, shortening molding cycle, preventing deformation of the container body and white powder generation, improving physical properties and the like. That is, by increasing rigidity and elevating crystallization temperature, cooling time can be shortened without forming bottom sink mark and buckling, and a great quantity of molded container bodies can be put into a hopper or a container box without deformation immediately after molding. Moreover, Rockwell hardness and wear resistance can be sharply improved, and a great effect is exhibited on the prevention of white powder generation in a high speed processing and packaging process or air conveying process.

There are organic nucleating agents and inorganic nucleating agents, and organic nucleating agents, particularly dibenzylidenesorbitol compounds described previously are preferred. Inorganic nucleating agents may be selected from mentioned previously. The nucleating agent may be an organic nucleating agent alone, a combination of an organic nucleating agent and an inorganic nucelating agent or a combination of two or more organic nucleating agents. It is preferable to coat the surface of organic nucleating agent with a fatty acid, a fatty acid compound, a coupling agent, a surfactant or the like. A suitable content of organic nucleating agent is 0.01 to 2 wt. %. When the content is less than 0.01 wt. %, the blending effect is insufficient. While, when the content is beyond 2 wt. %, a further effect does not appear. According to the kind of nucleating agent, the excess amount induces various disadvantages such as adverse affect upon photographic film, adhesion to mold, bleeding out and sharp decrease of dropping strength. As the method of blending organic nucleating agent, there are compound method, dry blending method, masterbatch method and the like, and the masterbatch method is preferred. Since most of organic nucleating agents are bulky and liable to be scattered, it is preferable to blend a small amount of dispersing agent or wetting agent. Suitable dispersing agents include carboxylic anhydrides and higher fatty acids, and lubricants such as oleic amide are particularly preferred. Suitable wetting agents include plasticizers such as DOP and DHP.

To blend a coupling agent is preferred in view of removing the unfavorable odor of the organic nucleating agent. Suitable coupling agents are similar to those mentioned previously. A suitable content of the coupling agent is 0.01 to 2 wt. %.

To incorporate 0.01 to 1 wt. % of an antioxidant is preferred in view of efficient continuous molding. Suitable antioxidants are phenol antioxidants, ketone-amine condensate antioxidants, arylamine antioxidants, imidazole antioxidants, phosphite antioxidants, thiourea antioxidants, sulfur antioxidants and other antioxidants, mentioned previously.

A coloring material may be added. Examples of the coloring materials are inorganic compounds, such as oxides, hydroxides, carbonates, sulfates, sulfites, silicates, carbons and others, and organic compounds, mentioned previously.

Among them, preferred coloring materials impart opacity, and light-absorptive carbon black, titanium nitride and graphite and light-reflective aluminum powder, aluminum paste, calcium carbonate and titanium dioxide are particularly preferred because of being excellent in heat resistance and light resistance and being relatively inactive.

Various additives may be added to the resin composition composing the container body of the invention. Examples of the additives are aforementioned plasticizers, stabilizers, flame retardants, fillers, reinforcing agents, vulcanizing agents, deterioration preventing agents, various thermoplastic resin, elastomers and rubbers. Polyolefin thermoplastic resins are particularly preferred.

An embodiment of the container body of the invention is shown in FIGS. 18 and 19. The container body is similar to illustrated in FIG. 1, and the thickened portion 13 is formed on the inside at the opposite part to the gate mark portion 9 provided at the center of a recess 12. The form of the thickened portion 13 is semispherical. The scrapable part 14 is indicated by reticulation.

Another embodiment of the container body is shown in FIGS. 20 and 21. The container body is similar to illustrated in FIG. 5, and the thickened portion 13 is formed on the inside at the opposite part to the gate mark portion 9. The form of the thickened portion is semispherical.

Figure 22:
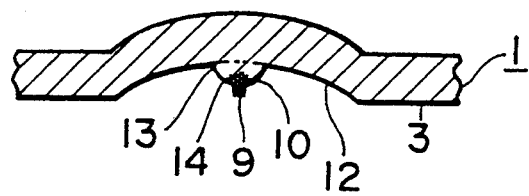
FIGS. 22 to 25 are enlarged sectional views around the gate mark portion of still other thickening examples.
Figure 23:
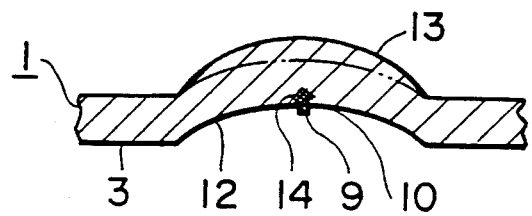
Figure 24:
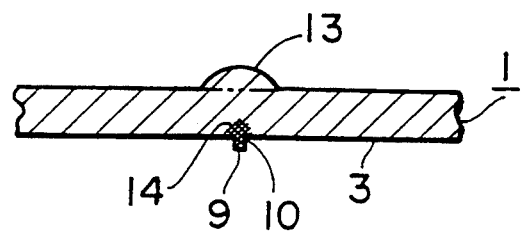
Figure 25:
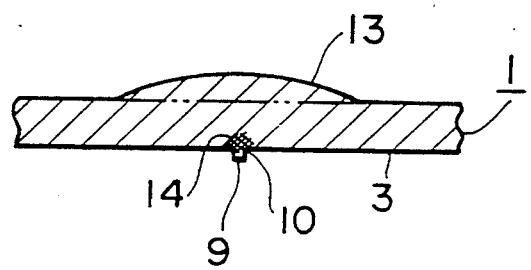
Figure 26:
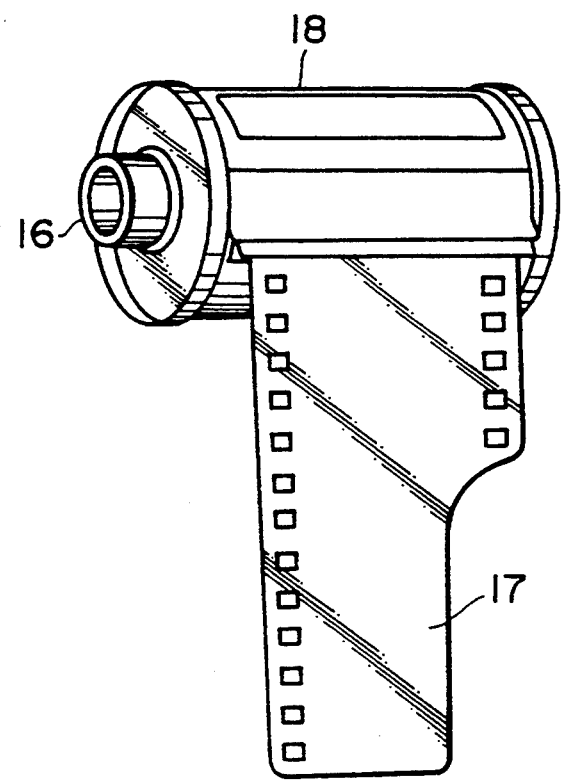
FIG. 26 is a perspective view of a photographic film cartridge.

Some other embodiments are shown in FIGS. 22 through 25. In the embodiment of FIG. 22, the thickened portion is formed on the outside at the gate mark portion 9. In the embodiment of FIG. 23, the thickened portion covers the entire recess 12. The form of the thickened portion 13 is convex lens composed of a convex portion and a concave portion. In the embodiment of FIG. 24, the thickened portion is formed on the inside at the opposite part to the gate mark portion 9 which is formed on the flat bottom portion 3. In the embodiment of FIG. 25, the thickened portion 13 is extended compared with the embodiment of FIG. 24.

In the above container body of the invention, the thickened portion secures moistureproofness, even when the gate mark portion is scraped. Therefore, the molding cycle can be shortened, particularly, in the case of a closed system injection molding machine using a hot runner type mold.

In the container bodies of the invention mentioned heretofore, the thickness of the peripheral wall portion and the bottom portion is preferably 0.5 to 1.3 mm, in view of quality, moldability and cost.

The container bodies of the invention can be formed by various known molding methods, and injection molding is preferred. The injection molding method may be the most typical method of single molding or any other method such as injection blow molding, intermold vacuum injection molding, stack molding and the like. A particularly preferred process uses a closed system injection molding machine containing a hot runner type mold having a number of cavities of not less than 24.

Figure 4:
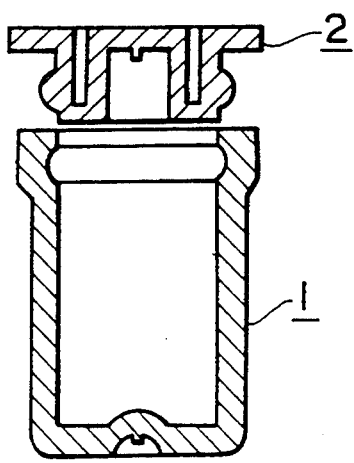
FIGS. 4 to 8 indicate some other containers for a photographic film cartridge to which the present invention is applicable.
Figure 5:
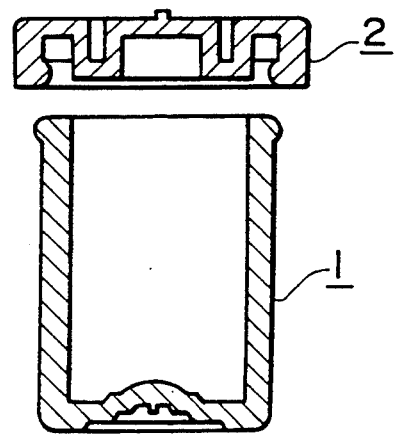
Figure 6:
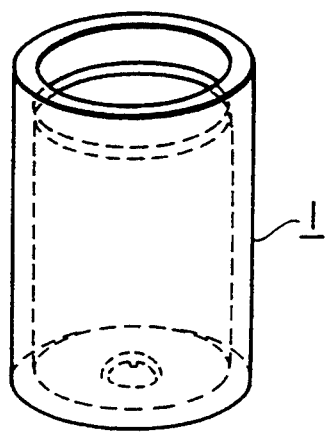
Figure 7:
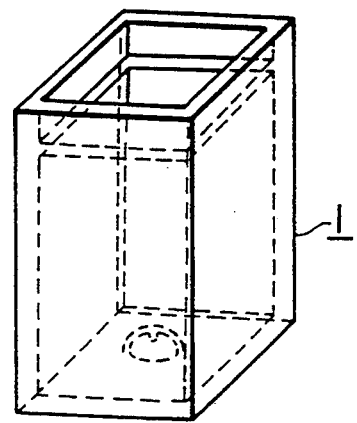
Figure 8:
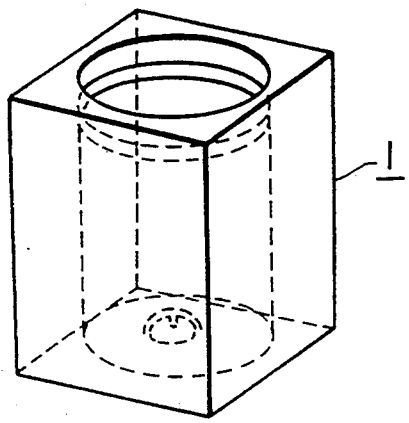

The form of the container bodies of the invention is not limited. However, preferable container bodies have a good sealability with a cap attached thereto and easy detachment of the cap and includes those disclosed in Japanese Patent KOKAI Nos. 61-73947, 63-193142, 64-9445, 1-2135. Some container bodies are shown in FIG. 4 to FIG. 8. The container bodies of FIG. 4 to FIG. 6 are cylindrical, and the container body of FIG. 7 is rectangular. The container body of FIG. 8 is formed into a cylindrical shape on the inside portion in which is placed a film cartridge and a rectangular shape on the outside portion.

The material of the cap is preferably more flexible than the container body 1 in order to improve the fitting sealability to the container body and to exhibit the aforementioned functions sufficiently. Preferred materials include low density polyethylene resin, various blend resins of the above resins and other thermoplastic resins. To add 0.01 to 0.6 wt. % of fatty amide lubricant is preferred in view of improving injection moldability and antistatic property.

The resin composition used for the container body of the invention is also suitable for molded articles adversely affected by the bleeding out of various additives, requiring impact strength and no deformation, such as the hinged plastic cases disclosed in Japanese Utility KOKAI Nos. 54-100617, 54-137344, 59-77144 and 62-99571, Japanese Patent KOKAI No. 63-223640 and EP 0 242 905A, lid-fitting type containers disclosed in Japanese Utility Model KOKOKU No. 44-28473 and Japanese Patent KOKOKU NO. 46-7501, spools disclosed in Japanese Utility Model KOKOKU Nos. 61-3000, 61-36995 and 61-36996 and Japanese Utility Model KOKAI No. 63-73742, and cores disclosed in Japanese Utility Model KOKAI Nos. 61-86367 and 61-128256.

The container bodies of the invention and the above molded articles may be imparted with light-shielding ability by blending a light-shielding material.

The form of container bodies may be changed so that two or more photographic film cartridges can be placed therein. The container bodies of the invention may be used as the sealing containers for medicines, small articles, foods, dolls, small samples, seeds or the like. A certain modification in shape or size is also possible. A scale indicating volume, a picture or letters can be printed on the container. The containers can be packaged by a shrinkable film.

EXAMPLES

Example I

The container body of Example I was formed of the resin composition of 99.4 wt. % of propylene-ethylene random copolymer resin having an ethylene content of 3 wt. %, 0.3 wt. % of oleic amide, 0.15 wt. % of calcium stearate, 0.2 wt. % of an organic nucleating agent of a dibenzylidenesorbitol compound and 0.1 wt. % of a phenolic antioxidant. The resin composition had a MI (ASTM D-1238) of 40 g/10 minutes, a bending elastic modulus (ASTM D-790) of 10,800 kg/cm$^2$, a notched Izod impact strength (ASTM D-256) at 23° C. of 4.5 kg·cm/cm and a Rockwell hardness (ASTM D-785) of 85 R., and the container body 1 shown in FIG. 1 having a bottom thickness of 0.8 mm was molded by injection molding at a resin temperature of 220° C. The cooling water temperature was 15° C., and the cooling time was 1.5 seconds. One molding cycle time was 7.5 seconds. The type of runner was hot runner, and the molding number for one cycle was 24. The surface temperature immediately after the molding was 30° C., and the Rockwell hardness at the bottom portion was 60 R.

Example II

The container body of Example II was formed of a resin composition of 99.4 wt. % of propylene-ethylene random copolymer resin having an ethylene unit content of 2.5 wt. %, 0.3 wt. % of oleic amide, 0.15 wt. % of calcium stearate, 0.2 wt. % of an organic nucleating agent of a dibenzylidenesorbitol compound and 0.1 wt. % of a phenolic antioxidant. The resin composition had a MI of 40 g/10 minutes, a bending elastic modulus of 14,000 kg/cm$^2$, a notched Izod impact strength at 23° C. of 3.0 kg·cm/cm and a Rockwell hardness of 95 R, and the container body having the same form and size as Example I was molded at a resin temperature of 220° C. The cooling water temperature was 15° C., and the cooling time was 1 second. One molding cycle time was 7 seconds. The type of runner was hot runner, and the molding number for one cycle was 24. The surface temperature immediately after the molding was 35° C., and the Rockwell hardness at the bottom portion was 87 R.

Comparative Example I

The container body of Comparative Example I was formed of the resin composition of 99.4 wt. % of the propylene-ethylene random copolymer resin having an ethylene unit content of 3 wt. %, 0.3 wt. % of oleic amide, 0.15 wt. % of calcium stearate, 0.2 wt. % of an organic nucleating agent of aluminum p-t-butylbenzoate and 0.1 wt. % of a phenolic antioxidant. The resin composition had a MI of 25 g/10 minutes, a bending elastic modulus of 9,200 kg/cm$^2$, a notched Izod impact strength at 23° C. of 4.0 kg·cm/cm and a Rockwell hardness (ASTM D-785) of 80 R, and the container body having the same form and sized as Example I was molded at a resin temperature of 220° C. The cooling water temperature was 15° C., and the cooling time was 5 seconds in order to prevent buckling. One molding cycle time was 13 seconds. The type of runner was hot runner, and the molding number for one cycle was 24. The surface temperature immediately after the molding was 23° C., and the Rockwell hardness at the bottom portion was 52 R.

Comparative Example II

Using the same resin composition as Comparative Example I, the container body of Comparative Example II was molded in the same manner as Comparative Example I, except that the cooling time was 6 seconds, therefore, the molding cycle was 14 seconds, and the surface temperature of the container body immediately after the molding was 20° C. The Rockwell hardness at the bottom portion was 46 R.

Comparative Example III

Using the same resin composition as Example I, the container body having the same form and size as Example I was molded at a resin temperature of 200° C. The cooling water temperature was 10° C., and the cooling time was 3 seconds. One molding cycle time was 10 seconds. The type of runner was hot runner, and the molding number for one cycle was 24. The surface temperature immediately after the molding was 20° C., and the Rockwell hardness at the bottom portion was 51 R.

Figure 2:
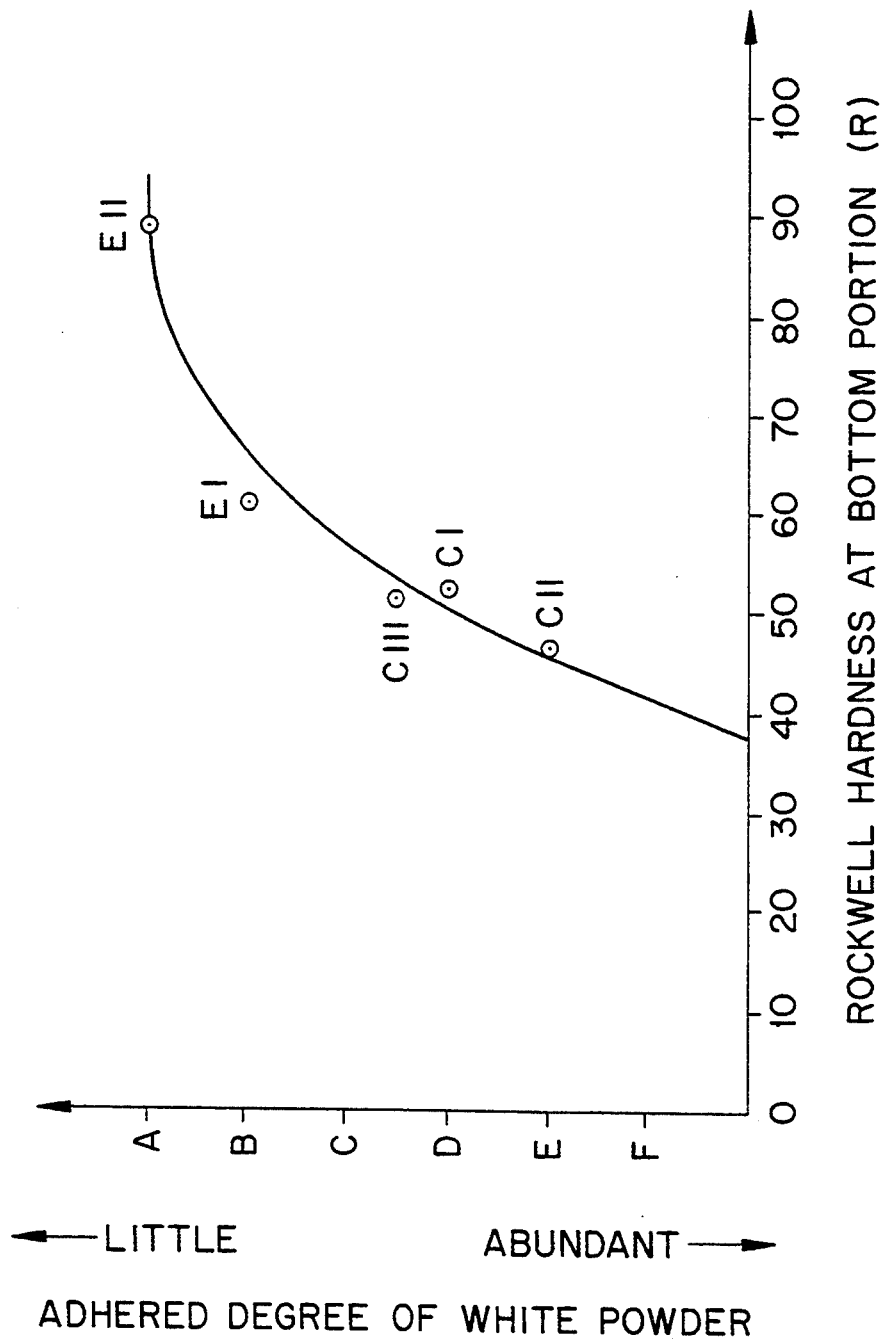
FIG. 2 is a graph indicating the relation between the Rockwell hardness at the bottom portion and the adhered amount of white powder to the tongue portion of a photographic film.

A photographic film of 36 exposures was placed in each of the above container bodies, and the same cap as shown in FIG. 1 was attached thereto. Then, each container was fixed to a shaking test machine (indicated by JIS Z-0232) with a tape, and shaken at an oscillation of 5 mm at a vibration frequency of 550 cycles/min for 60 minutes. After the shaking, the quantity of white powder adhered to the leading end of the photographic film was measured by visual inspection. The results are shown FIG. 2. In the figure, the axis of the ordinate indicates the adhered degree of white powder, and the meaning of each alphabet letter is as follows: A ... very excellent, B ... excellent, C ... practical (within a practical limit), D ... having a problem (improvement is necessary), E ... impractical, F ... impractical (extremely bad). As shown in the figure, the container bodies of Example I (EI) and Example II (EII) are enough to put them to practical use, while the container bodies of Comparative Example I (CI), Comparative Example V (CII) and Comparative Example III (CIII) cannot be put to practical use. The results indicate that, when the Rockwell hardness at the bottom portion is more than 55 R, the adhered amount of white powder is within a practical limit.

Example III

Figure 3:
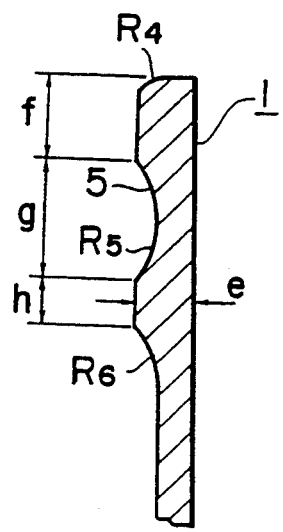
FIG. 3 is an enlarged partially sectional view indicating the fitting portion of the container body shown in FIG. 1.

A container body for a photographic film cartridge shown in FIGS. 1 and 3 was molded. The container body has a thickness (a) of 0.8 mm, a length (b) of 51 mm, a diameter (c) of 31 mm, a diameter of the projection at the bottom (d) of 6 mm, a thickness of the opening part (e) of 1 mm, a width of the upper annular projection (f) of 1.7 mm, a width of the annular fitting groove (g) of 2 mm, a width of the lower annular projection (h) of 1 mm, the radius at the inside connecting portion between the peripheral wall portion and the bottom portion ($R_1$) of 1.5 mm, the same of the outside ($R_2$) of 1.7 mm, the radius of the recess ($R_3$) for the gate mark of 4 mm, the radius of the inside upper edge ($R_4$) of 0.5 mm, the radius of the fitting groove ($R_5$) of 1.5 mm and the radius of the undercut portion of the lower annular projection ($R_6$) of 6 mm. The container body was molded by using a closed type injection molding machine ("NETSTAL", Sumitomo Heavy Industries Ltd.) at a mold claming pressure of 150 t. The molding number for one cycle was 24, and the type of runner was a hot runner.

The container body of Example III was formed of the resin composition of 99.2 wt. % of propylene-ethylene random copolymer resin having an ethylene content of 2.5 wt. %, a MI (ASTM D-1238) of 38 g/10 minutes, a density (ASTM D-1505) of 0.90 g/cm$^3$, a bending elastic modulus (ASTM D-790) of 12,800 kg/cm$^2$, a notched Izod impact strength (ASTM D-256) at 23° C. of 3.2 kg·cm/cm and a Rockwell hardness (ASTM D-785) of 92 R, 0.1 wt % of oleic amide ("FATTY AMIDE O", Kao Corp.), 0.3 wt. % of a nonionic surfactant lubricant of fatty acid ester ("ELECTROSTRIPPER TS-5", Kao Corp ), 0.1 wt. % of calcium stearate, 0.1 wt. % of a phenol antioxidant (tetrakis methylene-3-(3′,5′-di-t-butyl-4′-hydroxyphenyl) propionate methane), and 0.2 wt. % of an organic nucleating agent (1,3,2,4-di(methylbenzylidene)sorbitol).

Example IV

The container body for a photographic film cartridge of Example IV has the same form and size as Example III, and was molded in the same manner as Example III.

This container body was formed of the resin composition of 99.2 wt. % of propylene-ethylene random copolymer resin having an ethylene content of 2.5 wt. %, a MI of 40 g/10 minutes, a density of 0.90 g/cm$^3$, a bending elastic modulus of 10,500 kg/cm$^2$, a notched Izod impact strength at 23° C. of 4.5 kg·cm/cm and a Rockwell hardness of 85 R, 0.05 wt. % of erucic amide ("ALFLOW P-10", Nippon Oil and Fats Co., Ltd.), 0.35 wt. % of a nonionic surfactant lubricant of alkylamine ("ELECTROSTRIPPER TS-3", Kao Corp.), 0.1 wt. % of calcium stearate, 0.1 wt. % of a phenol antioxidant (the same as Example III), and 0.2 wt. % of an organic nucleating agent (the same as Example III).

Comparative Example IV

The container body of Comparative Example IV has the same form and size as Example III, and was molded in the same manner as Example III.

This container body was formed of 99.2 wt. % of the same propylene-ethylene random copolymer resin as Example IV, 0.5 wt. % of oleic amide (the same as Example III), 0.1 wt. % of a phenol antioxidant (the same as Example III) and 0.2 wt. % of an organic nucleating agent (the same as Example III).

Comparative Example V

The container body of Comparative Example V has the same form and size as Example III, and was molded in the same manner as Example III.

This container body was formed of the resin composition of 99.3 wt. % of propylene-ethylene random copolymer resin having an ethylene content of 3.5 wt. %, a MI of 25 g/10 minutes, a density of 0.90 g/cm$^3$, a bending elastic modulus of 8,700 kg/cm$^2$, a notched Izod impact strength at 23° C. of 4.6 kg·cm/cm and a Rockwell hardness of 76 R, 0.3 wt. % of oleic amide (the same as Example III), 0.1 wt. % of calcium stearate, 0.1 wt. % of a phenol antioxidant (the same as Example III), and 0.2 wt. % of an organic nucleating agent (the same as Example III).

Comparative Example VI

The container body of Comparative Example VI has the same form and size as Example III, and was molded in the same manner as Example III.

This container body was formed of 99.7 wt. % of the same propylene-ethylene random copolymer resin as Example IV, 0.1 wt. % of a phenol antioxidant (the same as Example III) and 0.2 wt. % of an organic nucleating agent (the same as Example III).

Various properties of the container bodies of Examples III and IV and Comparative Examples IV through VI were measured, and summarized in Table 1.

TABLE 1

| | Unit | Invention | | Comparative | | |
| --- | --- | --- | --- | --- | --- | --- |
| | | III | IV | IV | V | VI |
| Propylene-Ethylene Copolymer Resin | | | | | | |
| MI | g/10 | 38 | 40 | 40 | 25 | 40 |
| Density | g/cm$^3$ | 0.90 | 0.90 | 0.90 | 0.90 | 0.90 |
| Bending Elastic Modulus | kg/cm$^2$ | 12800 | 10500 | 10500 | 8700 | 10500 |
| Notched Izod Impact Strength at 23° C. | kg · cm/cm | 3.2 | 4.5 | 4.5 | 4.6 | 4.5 |
| Rockwell Hardness | R | 92 | 85 | 85 | 76 | 85 |
| Ethylene Content | wt. % | 2.5 | 3.0 | 3.0 | 3.5 | 3.0 |
| Fatty Amide Lubricant | — | Oleic Amide | Erucic Amide | Oleic Amide | ″ | — |
| Content | wt. % | 0.1 | 0.05 | 0.5 | 0.3 | — |
| Surfactant Lubricant | — | Nonionic (Fatty Ester) | Nonionic (Alkylamine) | — | — | — |
| Content | wt. % | 0.3 | 0.35 | — | — | — |
| Ca Stearate Content | wt. % | 0.1 | 0.1 | — | 0.1 | — |
| Phenol Antioxidant Content | wt. % | 0.1 | 0.1 | 0.1 | 0.1 | 0.1 |
| Nucleating Agent | wt. % | 0.2 | 0.2 | 0.2 | 0.1 | 0.1 |

TABLE 1-continued

|  | Unit | Invention III | Invention IV | Comparative IV | Comparative V | Comparative VI |
|---|---|---|---|---|---|---|
| Content |  |  |  |  |  |  |
| Putting Photographic Film in and out | — | A | A | B | A | E |
| White Powder (After one day) | — | A | A | C | D | A |
| (After seven days) | — | B–A | B–A | D–E | E | B–A |
| Injection Moldability | — | A | A | B | D | E |
| Transparency (After seven days) | — | A | A | C | B | A |
| Static Electrification | — | A | A | B | C | E |
| Photographic Properties | — | B | B | C | B | C |

Evaluation in Table 1 were carried out as follows:
A very excellent
B excellent
C practical
D having a problem improvement is necessary
E impractical Testing methods were as follows:
Putting Photographic Film In and Out:
Evaluated by the difficulty when a photographic film cartridge was placed in and taken out of each container body.

White Powder (After one day):
Each container body was allowed to stand in an air-conditioned room at 20° C. at 65% RH for one day after injection molding. A photographic film cartridge was placed therein, and a cap was attached. Then, each container was shaken by a vibration testing machine defined in JIS Z-0232 at a vibration amplitude of 5 mm at a frequency of 550 times/min. for 60 minutes, and the amount of white powder adhered to the leading end portion of the photographic film was evaluated by visual inspection.

White Powder (After seven days):
Each container body was allowed to stand in an air-conditioned room at 20° C. at 65% RH for seven days and was evaluated in the same manner as the case after one day.

Injection Moldability:
Judged by the occurrence of molding troubles such as short shot, bottom sink mark and deformation, releasability from the mold and molding cycle, collectively.

Transparency (After seven days):
Each container body was allowed to stand in an air-conditioned room at 20° C. at 65% RH for seven days, and then, gradually moved far from the transparency inspection chart of a white paper on which parallel lines each 0.5 mm in thickness were drawn at an interval of 2 mm. The transparency was evaluated by the distance (cm) when the parallel lines could not be seen.

Static Electrification:
The voltage of the static electrification of each container body was measured by a volt meter, when 2000 pieces of the container body were molded and placed in a polyethylene bag.

Photographic Properties:
A cartridge containing a photographic film ("Fuji Color HR-100") of 36 exposures was placed in each container body and a cap was attached. The container was allowed to stand in an air-conditioned room at 35° C. at 85% RH for 30 days, and then developed. The photographic properties were evaluated by the occurrence of photographic abnormalities such as fogging and deviation of photographic sensitivity.

Example V

The container body of Example V was shown in FIG. 1 wherein the thickness (a) of the peripheral wall portion was 0.8 mm, and molded by using a closed type injection molding machine ("NETSTAL", Sumitomo Heavy Industries Ltd.) at a mold claming pressure of 150 t. The molding number for one cycle was 24, and the type of runner was a hot runner.

The container body of Example V was formed of a resin composition having a MI of 31 g/10 minutes, a density of 0.90 g/cm$^3$, a bending elastic modulus of 12,000 kg/cm$^2$, a notched Izod impact strength at 23° C. of 3.8 kg·cm/cm and a Rockwell hardness of 92 R composed of 35 wt. % of homopolypropylene resin having a MI (ASTM D-1238) of 40 g/10 minutes, a density (ASTM D-1505) of 0.91 g/cm$^3$, a bending elastic modulus (ASTM D-790) of 21,000 kg/cm$^2$, a notched Izod impact strength (ASTM D-256) at 23° C. of 2.5 kg·cm/cm and a Rockwell hardness (ASTM D-785, measured in a thickness of 3.2 mm) of 110 R, 64.35 wt. % of propylene-ethylene random copolymer resin having an ethylene content of 3.3 wt. %, a MI of 25 g/10 minutes, a density of 0.90 g/cm$^3$, a bending elastic modulus of 9,200 kg/cm$^2$, a notched Izod impact strength at 23° C. of 5.0 kg·cm/cm and a Rockwell hardness (ASTM D-785, measured in a thickness of 3.2 mm) of 80 R, 0.3 wt. % of oleic amide, 0.2 wt. % of a phenol antioxidant (the same as Example III), and 0.15 wt. % of an organic nucleating agent (the same as Example III).

Example VI

The container body of Example VI was the same as Example V, except that the content of the same homopolypropylene resin as Example V was changed to 64.35 wt. %, and the propylene-ethylene random copolymer resin was changed to 35 wt. % of propylene-ethylene block copolymer resin having an ethylene content of 6 wt. %, a MI of 25 g/10 minutes, a density of 91 g/cm$^3$, a bending elastic modulus of 12,500 kg/cm$^2$, a notched Izod impact strength at 23° C. of 13 kg·cm/cm and a Rockwell hardness (measured in a thickness of 3.2 mm) of 80 R. The resin composition had a MI of 30 g/10 minutes, a density of 0.90 g/cm$^3$, a bending elastic modulus of 13,300 kg/cm$^2$, a notched Izod impact strength at 23° C. of 8.2 kg·cm/cm and a Rockwell hardness of 89 R.

Comparative Example VII

The container body of Comparative Example VII was the same as Example V, except that the propylene-ethylene random copolymer resin was not blended and the content of the homopolypropylene resin was changed to 99.35 wt. %. The resin composition had a MI of 42 g/10 minutes, a density of 0.90 g/cm³, a bending elastic modulus of 21,600 kg/cm², a notched Izod impact strength at 23° C. of 2.6 kg·cm/cm and a Rockwell hardness of 112 R.

Comparative Example VIII

The container body of Comparative Example VIII was the same as Example V, except that the homopolypropylene resin was not blended and the content of the propylene-ethylene random copolymer resin was changed to 99.35 wt. %. The resin composition had a MI of 28 g/10 minutes, a density of 0.90 g/cm³, a bending elastic modulus of 9,800 kg/cm², a notched Izod impact strength at 23° C. of 5.5 kg·cm/cm and a Rockwell hardness of 83 R.

Comparative Example IX

The container body of Comparative Example IX was the same as Example VI, except that the homopolypropylene resin was not blended and the content of the propylene-ethylene block copolymer resin was changed to 99.35 wt. %. The resin composition had a MI of 26 g/10 minutes, a density of 0.90 g/cm³, a bending elastic moudus of 12,900 kg/cm², a notched Izod impact strength at 23° C. of 13.5 kg·cm/cm and a Rockwell hardness of 82 R.

Various properties of the container bodies of Examples V and VI and Comparative Examples VII through IX were measured, and summarized in Table 2.

Testing methods of White Powder and Transparency are the same as Table 1. The container bodies wre subjected to the evaluation of White Powder after several days from the molding.

Dropping Strength:
A cartridge containing 36 exposures photographic film ("Fuji Color HR-100") was placed in each container body, and a cap was attached. The container was dropped to concrete floor from 5 m height at room temperature (20° C.), and dropping strength was evaluated by the ratio of the cracked container bodies.

Whitening by Dropping:
In the above dropping strength test, the whitened state by the dropping shock of each container body was evaluated by visual inspection.

Injection Moldability:
Evaluated by the generation rate of molding troubles such as deformation at the opening part, buckling and releasing trouble from the mold, when each container body was molded at the cooling time of 3 seconds and the molding cycle time of 9 seconds.

Example VII

A container body shown in FIGS. 9 and 10 was molded by injection molding. The width (i) of ribs 7 was the same as the width (j) of grooves 8, and was 0.3 mm. The depth (k) of the groove 8 was 0.3 mm, and the thickness (1) of the peripheral wall portion 4 was 0.8 mm at the rib portion. The container body was formed of 99.7 wt. % of propylene-ethylene random copolymer resin having an ethylene content of 3.0 wt. %, a MI of 40 g/10 minutes, a bending elastic modulus of 9.900 kg/cm² and a notched Izod impact strength at 23° C. of 5.3 kg·cm/cm, 0.1 wt. % of fatty amide and 0.2 wt. % of 1,3,2,4-di(methylbenzylidene)sorbitol. The amount of resin used for each piece was 3 g.

TABLE 2

|  | Unit | Invention V | Invention VI | Comparative VII | Comparative VIII | Comparative IX |
|---|---|---|---|---|---|---|
| Homopolypropylene Resin | | | | | | |
| MI | g/10 min. | 40 | 40 | 40 | — | — |
| Density | g/cm³ | 0.91 | 0.91 | 0.91 | — | — |
| Bending Elastic Modulus | kg/cm³ | 21000 | 21000 | 21000 | — | — |
| Notched Izod Impact Strength at 23° C. | kg · cm/cm | 2.2 | 2.2 | 2.2 | — | — |
| Rockwell Hardness | R | 110 | 110 | 110 | — | — |
| Content | wt. % | 35 | 64.35 | 99.35 | — | — |
| Propylene-Ethylene Copolymer Resin | | | | | | |
| Resin Type | — | random | block | — | random | block |
| Ethylene Content | wt. % | 3.3 | 6.0 | — | 3.3 | 6.0 |
| MI | g/10 min. | 25 | 25 | — | 25 | 25 |
| Density | g/cm³ | 0.90 | 0.91 | — | 0.90 | 0.91 |
| Bending Elastic Modulus | kg/cm³ | 9200 | 12500 | — | 9200 | 12500 |
| Notched Izod Impact Strength at 23° C. | kg · cm/cm | 5.0 | 13.0 | — | 5.0 | 13.0 |
| Rockwell Hardness | R | 80 | 80 | — | 80 | 80 |
| Content | wt. % | 64.35 | 35 | — | 99.35 | 99.35 |
| Lubricant Content | wt. % | 0.3 | 0.3 | 0.3 | 0.3 | 0.3 |
| Antioxidant Content | wt. % | 0.2 | 0.2 | 0.2 | 0.2 | 0.2 |
| Nucleating Agent Content | wt. % | 0.15 | 0.15 | 0.15 | 0.15 | 0.15 |
| White Powder | — | B | B | B | D | D |
| Dropping Strength | — | B | B | D | B | A |
| Whitening by Dropping | — | B | C | B | B | D |
| Injection Moldability | — | B | B | B | D | C |
| Transparency | — | A | C | C | A | D |

Evaluations are the same as Table 1.

Example VIII

The form and size of the container body of Example VIII were the same as Example VII. The container body was formed of 99.7 wt. % of propylene-ethylene random copolymer resin having an ethylene content of 2.0 wt. %, a MI of 40 g/10 minutes, a bending elastic modulus of 11,300 kg/cm² and a notched Izod impact strength at 23° C. of 4.0 kg·cm/cm, 0.2 wt. % of fatty amide and 0.1 wt. % of 1,3,2,4-di(methyl-benzylidene)-sorbitol. The amount of resin used for each piece was 3 g.

Example IX

The container body of Example IX corresponds to the embodiment of FIGS. 11 and 12. The width (i) of ribs 7 was the same as the width (j) of grooves 8, and was 1 mm. The depth (k) of the groove 8 was 0.3 mm, and the thickness (1) of the peripheral wall portion 4 was 0.8 mm at the rib portion. The resin composition forming the container body was the same as employed in Example VII, and the amount of resin used for each piece was 3 g.

Example X

The container body of Example X corresponds to the embodiment of FIGS. 17 and 10. The width (i) of ribs 7 was the same as the width (j) of grooves 8, and was 2 mm. The resin composition forming the container body was the same as employed in Example VIII, and the used resin amount for each piece was 3 g.

Example XI

The container body of Example XI has the same form and size as Example VII. The container body was formed of 70 wt. % of propylene-ethylene random copolymer resin having an ethylene content of 3.0 wt. %, a MI of 35 g/10 minutes, a bending elastic modulus of 13,500 kg/cm² and a notched Izod impact strength of 3.5 kg·cm/cm, 29.6 wt. % of homopolypropylene resin having a MI of 9 g/10 minutes, a bending elastic modulus of 18,000 kg/cm² and a notched Izod impact strength at 23° C. of 2 kg·cm/cm, 0.3 wt. % of fatty amide and 0.1 wt. % of dibenzylidenesorbitol compound. The amount of resin used for each piece was 3 g.

Comparative Example X

The container body of Comparative Example X corresponds to FIG. 1, and the thickness (a) of the peripheral wall portion was 0.65 mm. The resin composition forming the container body was the same as employed in Example VIII, and the amount of resin used for each piece was 3 g.

Conventional Example I

The container body of Conventional Example I corresponds to FIG. 1, and the thickness (a) of the peripheral wall portion was 0.8 mm. The resin composition forming the container body was the same as employed in Example VII except that the fatty amide and 1,3,2,4-di(methylbenzylidene)sorbitol were not added. The amount of resin used for each was 4 g.

Various properties of the container bodies of Examples VII through XI, Comparative Example X and Conventional Example I were measured, and summarized in Table 3.

TABLE 3

|  | Unit | Invention VII | VIII | IX | X | XI | Comparative X | Conventional I |
| --- | --- | --- | --- | --- | --- | --- | --- | --- |
| Longitudinal Section | — | FIG. 9 | FIG. 9 | FIG. 11 | FIG. 17 | FIG. 9 | FIG. 1 | FIG. 1 |
| Lateral Section | — | FIG. 10 | FIG. 10 | FIG. 12 | FIG. 10 | FIG. 10 | — | — |
| Main Resin | — | P-E*1 Copolymer | " | " | " | P-E Copolymer 70.0 Homo P-P*2 29.6 | P-E Copolymer | " |
| Content | wt. % | 99.7 | 99.7 | 99.7 | 99.7 |  | 99.7 | 100 |
| Fatty Acid Compound | — | Fatty Amide | " | " | " | " | " | " |
| Content | wt. % | 0.1 | 0.2 | 0.1 | 0.2 | 0.3 | 0.2 | — |
| Nucleating Agent | — | DBS*3 | " | " | " | " | " | — |
| Content | wt. % | 0.2 | 0.1 | 0.2 | 0.1 | 0.1 | 0.1 | — |
| MI of P-E Copolymer | g/10 min. | 40 | 40 | 40 | 40 | 35 | 40 | 40 |
| Bending Elastic Modulus | kg/cm² | 9900 | 11300 | 9900 | 11300 | 13500 | 11300 | 9300 |
| Notched Izod Impact Strength | kg·cm/cm | 5.3 | 4.0 | 5.3 | 4.0 | 3.5 | 4.0 | 4.6 |
| Thickness of Linear Rib | mm | 0.8 | 0.8 | 0.8 | 0.8 | 0.8 | 0.65 av. | 0.8 av.*4 |
| Width of Linear Rib | mm | 3 | 3 | 1 | 2 | 3 | — | — |
| Width of Groove | mm | 3 | 3 | 1 | 2 | 3 | — | — |
| Depth of Groove | mm | 0.3 | 0.3 | 0.3 | 0.3 | 0.3 | — | — |
| Weight | g | 3 | 3 | 3 | 3 | 3 | 3 | 4 |
| Molding Cycle | — | A | A | A | A | A | B | D |
| Prevention of Buckling | — | A | A | A | A | A | E | D |
| Compressive Strength | — | B | B | B | B | A | E | B |
| Dropping Strength | — | B | B | B | B | B | F | B |
| Fitting Strength | — | B | B | B | B | B | E | B |
| Appearance | — | A | A | A | A | A | B | C |
| Prevention of White Powder | — | A | A | B | A | A | B | D |
| Molding Trouble | — | A | A | A | A | A | E | D |
| Bottom Sink Mark | — | B | B | C | B | A | C | C |
| Deformation during | — | C | B | C | B | A | E | C |

TABLE 3-continued

|  | Unit | Invention | | | | | Comparative Conventional | |
|---|---|---|---|---|---|---|---|---|
|  |  | VII | VIII | IX | X | XI | X | I |
| Storage |  |  |  |  |  |  |  |  |

*[1] Propylene-ethylene random copolymer resin
*[2] Homopolypropylene resin
*[3] Dibenzylidenesorbitol compound
*[4] Average Evaluations in Table 3 were carried out as follows:
A very excellent
B excellent
C practical
D having a problem improvement is necessary
E impractical
F impractical an particularly inferior Evaluations in Table 3 were carried out as follows:
A very excellent
B excellent
C practical
D having a problem improvement is necessary
E impractical
F impractical an particularly inferior The testing method of Dropping Strength and Prevention of White Powder were the same as Table 2. The remaining testing methods were as follows:

Molding Cycle:
The time of one cycle of injection-cooling-taking out.

Prevention of Buckling:
Evaluated by the generation rate of buckling, when each container body was molded by using an injection molding machine ("NETSTAL", Sumitomo Heavy Industries Ltd.) at a mold clamping pressure of 150 t. The molding number for one cycle was 24, and the type of runner was a hot runner.

Compressive Strength:
Evaluated by the minumum force necessary to deform each container body by pressing through a flat plate.

Fitting Strength:
A spring balance was provided with a grip member. Each cap was grasped by the grip member, and the spring balance was pulled in only the upward direction. The force necessary to detach each cap was measured.

Appearance:
The appearance of each container body was evaluated by visual inspection in view of attractiveness and commercial discrimination.

Molding Trouble:
Evaluated by the generation rate of appearance and form troubles such as stringiness, short shot, gate mark, deformation and mold releasing trouble.

Bottom Sink Mark:
Red seal ink was coated onto the bottom portion of each container body, and pressed to a white paper. This property was evaluated by visual observation. When a bottom sink mark was present, the central portion of the bottom was not stamped.

Deformation during Storage:
50,000 pieces of each container body were stocked in a rectangular parallelepiped hopper for 5 days, and the generation rate of deformation was evaluated.

Example XII

A container body for a photographic film cartridge shown in FIGS. 18 and 19 was molded. The container body has a thickness (a) of 0.8 mm, a length (b) of 51 mm, a diameter (c) of 31 mm, a diameter of the recess 12 at the bottom (m) of 6 mm, a depth of the recess 12 of 1 mm, a radius (m) of the thickened portion 13 of 0.5 mm, a thickness of the opening part (e) of 1 mm, a width of the upper annular projection (f) of 1.7 mm, a width of the annular fitting groove (g) of 2 mm, a width of the lower annular projection (h) of 1 mm, the radius at the inside connecting portion between the peripheral wall portion and the bottom portion ($R_1$) of 1.5 mm, the same of the outside ($R_2$) of 1.7 mm, the radius of the recess ($R_3$) for the gate mark of 4 mm, the radius of the inside upper edge ($R_4$) of 0.5 mm, the radius of the fitting groove ($R_5$) of 1.5 mm and the radius of the undercut portion of the lower annular projection ($R_6$) of 6 mm. The container body was molded by using a closed type injection molding machine ("SYCAP", Sumitomo Heavy Industries Ltd.) at a mold clamping pressure of 150 t. The molding number for one cycle was 24, and the type of runner was a hot runner.

The container body of Example XII was formed of the resin composition of 99.4 wt. % of propylene-ethylene random copolymer resin having an ethylene content of 3 wt. %, a MI (ASTM D-1238) of 40 g/10 minutes, a density (ASTM D-1505) of 0.91 g/cm$^3$, a bending elastic modulus (ASTM D-790) of 12,500 kg/cm$^2$, a notched Izod impact strength (ASTM D-256) at 23° C. of 4.3 kg·cm/cm, a Rockwell hardness (ASTM D-785, measured with a sheet 3.2 mm in thickness) of 92 R and a molecular weight distribution (weight average molecular weight/number average molecular weight) measured by gel permeation chromatography of 5.1, 0.2 wt. % of oleic amide, 0.1 wt. % of a nonionic surfactant lubricant ("ELECTROSTRIPPER TS-3", Kao Corp.), 0.1 wt. % of a phenol antioxidant, and 0.2 wt. % of an organic nucleating agent (1,3,2,4-di(methylbenzylidene)sorbitol).

The container body was fitted with a cap shown in FIG. 18 formed of a branched low density homopolyethylene resin produced by tubular high pressure polymerization process. The moisture permeability of the container was 1.5 mg after allowing it to stand at 40° C. at 90% RH for 24 hours. While, the moisture permeability of the conventional container not thickened at the gate mark portion was 3.8 mg measured under the same conditions. It is indicated that moisture permeability is sharply decreased by thickening the gate mark portion. Moreover, flow mark trouble and weld mark trouble were improved compared with the conventional container body. The generation of pinholes did not occur by the thickening of the gate mark portion, even when it was scraped. Thus, moistureproofness can be secured in a high possibility.

We claim:

1. A container body for a photographic film cartridge having a peripheral wall portion and a bottom portion, said container body being composed of more than 70wt. % of a propylene-ethylene random copolymer resin having an ethylene content of 1 to 5 wt. %, said propylene-ethylene random copolymer resin having a melt index of 10 to 60 g/10 minutes, a notched Izod impact strength at 23° C. of more than 2.0 kg·cm/cm, and a bending elastic modulus of more than 9,000 kg/cm$^2$ and containing at least 0.005 to 0.3 wt. % of a fatty acid amide lubricant and 0.005 to 0.6 wt. % of a surfactant lubricant different from said fatty acid amide lubricant and the sum of both lubricants being 0.01 to 0.9 wt. %, wherein the Rockwell hardness of the bottom portion is not less than 85 R.

2. The container body of claim 1 which contains 0.01 to 1 wt. % of an organic nucleating agent of a dibenzylidene-sorbitol compound and 0.01 to 1 wt. % of an antioxidant.

3. A container body for a photographic film cartridge, said container body having a peripheral wall portion and a bottom portion wherein the bottom portion has a gate mark portion, said container body consisting essentially of a polyolefin resin having a melt index of 10 to 60 g/10 minutes, a notched Izod impact strength at 23° C. of more than 2.0 kg·cm/cm, and a bending elastic modulus of more than 9,000 kg/cm$^2$ wherein the gate mark portion is thicker by 10 to 100 % than the neighboring portions of the bottom portion and wherein the bottom portion has a Rockwell hardness of more than 80 R.

4. The container body of claim 3 wherein the thickness of the gate mark portion is thicker than the neighboring portions of the bottom by 30 to 100 %.

5. The container body of claim 3 wherein the container body comprises a thermoplastic resin selected from homopolypropylene resin, propylene-α-olefin random copolymer resin, propylene-α-olefin block copolymer resin, high density polyethylene resin, high impact polystyrene resin containing synthetic rubber, blends thereof, and blends of said resins with at least one polyolefin resin.

6. The container body of claim 3 which contains more than 70 wt. % of propylene-ethylene copolymer resin having a MI of 20 to 45 g/10 minutes, a notched Izod impact strength at 23° C. of more than 2.5 kg·cm/cm and a Rockwell hardness of more than 80 R, and which contains at least one of a lubricant and a surfactant.

7. A container body for a photographic film cartridge, said container body having a peripheral wall portion and a bottom portion wherein the bottom portion has a gate mark portion comprised of a thermoplastic resin wherein the gate mark portion is thicker than the neighboring portions of the bottom portion, wherein the bottom portion has a Rockwell hardness of more than 55 R and which contains more than 70 wt. % of propylene-ethylene copolymer resin having a MI of 20 to 45 g/10 minutes, a bending elastic modulus of more than 8,000 kg/cm$^2$, a notched Izod impact strength at 23° C. of more than 2.5 kg cm/cm, and Rockwell hardness of more than 80 R, and which contains at least one of a lubricant and a surfactant.

8. A container body for a photographic film cartridge, said container body having a peripheral wall portion and a bottom portion and being made of a thermoplastic resin composition containing high density polyethylene resin having a melt index of 10 to 60 g/10 minutes, a notched Izod impact strength at 23° C. of more than 2.0 kg·cm/cm, and a bending elastic modulus of more than 9,000 kg/cm$^2$, more than 0.001 wt. % of lubricant and more than 0.01 wt. % of antistatic agent, wherein the bottom portion is 0.5 to 1.3 mm in average thickness and is more than 55 R in Rockwell hardness.

9. The container body for a photographic film cartridge of claim 8 wherein the thermoplastic resin composition contains more than 0.01 wt. % of a dibenzylidene sorbitol compound.

10. A container body for a photographic film cartridge, said container body having a peripheral wall portion and a bottom portion and being made of a thermoplastic resin composition containing a member having a melt index of 10 to 60 g/10 minutes, a bending elastic modulus of more than 9000 kg/cm$^2$, a notched Izod impact strength at 23° C. of more than 2.0 kg cm/cm and being selected from the group consisting of high density polyethylene resin or high impact polystyrene resin containing synthetic rubber and blends of said resins, more than 0.001 wt. % of lubricant and more than 0.01 wt. % of antioxidant agent, wherein the bottom portion and the peripheral wall portion are 0.5 to 1.3 mm in average thickness and wherein the bottom portion is more than 55 R in Rockwell hardness.

11. The container body for a photographic film cartridge of claim 10 wherein the thermoplastic resin composition contains more than 0.01 wt. % of a dibenzylidene sorbitol compound.

12. A container body for a photographic film cartridge, said container body having a peripheral wall portion and a bottom portion and being made of polyolefin resin composition having a melt index of 10 to 60 g/10 minutes and a bending elastic modulus of more than 9,000 kg/cm$^2$ and containing a member selected from the group consisting of middle density polyethylene resin, high density polyethylene resin or ethylene α-olefin copolymer resin, more than 0.001 wt. % of lubricant, surfactant or coupling agent and 0.01 to 1.0 wt. % of antioxidant, wherein the notched Izod impact strength at 23° C. is more than 2.0 kg·cm/cm, the bottom portion and the peripheral wall portion are 0.5 to 1.3 mm in average thickness, and the Rockwell hardness is more than 55 R.

13. The container body for a photographic film cartridge of claim 12 wherein the polyolefin resin composition contains 0.01 to 1.0 wt. % sorbitol compound.

14. A container body for a photographic film cartridge, said container body having a peripheral wall portion and a bottom portion and being made of a thermoplastic resin composition consisting essentially of high density polyethylene resin or ethylene-α-olefin copolymer resin, said high density polyethylene resin or said ethylene-α-olefin copolymer resin having a melt index of 10 to 60 g/10 minutes, a notched Izod impact strength at 23° C. of more than 2.0 kg·cm/cm, and a bending elastic modulus of more than 9,000 kg/cm$^2$, wherein the bottom portion is more than 55 R in Rockwell hardness.

15. The container body for a photographic film of claim 14 wherein the thermoplastic resin composition contains at least one of a lubricant and a surfactant.

16. The container body for a photographic film of claim 14 wherein the thermoplastic resin composition contains 0.01 to 1 wt. % of an antioxidant.

17. The container body for a photographic film of claim 14 wherein the thermoplastic resin composition contains 0.01 to 2 wt. % of a dibenzylidene sorbitol compound.

18. The container body for a photographic film of claim 17 wherein the bottom portion is 0.5 to 1.3 mm in average and the peripheral wall portion is 0.5 to 1.3 mm in average.

19. The container body for a photographic film of claim 14 wherein the bottom portion is 0.5 to 1.3 mm in average and the peripheral wall portion is 0.5 to 1.3 mm in average.

20. The container body for a photographic film of claim 15 wherein the bottom portion is 0.5 to 1.3 mm in average and the peripheral wall portion is 0.5 to 1.3 mm in average.

21. The container body for a photographic film of claim 16 wherein the bottom portion is 0.5 to 1.3 mm in average and the peripheral wall portion is 0.5 to 1.3 mm in average.

* * * * *